(12) United States Patent
Miyagi et al.

(10) Patent No.: US 11,466,114 B2
(45) Date of Patent: Oct. 11, 2022

(54) RESIN COMPOSITION FOR FORMING PHASE-SEPARATED STRUCTURE, METHOD FOR PRODUCING STRUCTURE INCLUDING PHASE-SEPARATED STRUCTURE, AND BLOCK COPOLYMER

(71) Applicants: TOKYO OHKA KOGYO CO., LTD., Kawasaki (JP); NATIONAL UNIVERSITY CORPORATION HOKKAIDO UNIVERSITY, Hokkaido (JP)

(72) Inventors: Ken Miyagi, Kawasaki (JP); Takahiro Dazai, Kawasaki (JP); Toshifumi Satoh, Hokkaido (JP); Takuya Isono, Hokkaido (JP)

(73) Assignees: TOKYO OHKA KOGYO CO., LTD., Kawasaki (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 78 days.

(21) Appl. No.: 16/878,314

(22) Filed: May 19, 2020

(65) Prior Publication Data
US 2020/0369819 A1    Nov. 26, 2020

(30) Foreign Application Priority Data
May 22, 2019 (JP) .............................. JP2019-096207

(51) Int. Cl.
*C08F 293/00* (2006.01)
*C08F 8/30* (2006.01)
(Continued)

(52) U.S. Cl.
CPC ............. *C08F 293/00* (2013.01); *C08F 8/14* (2013.01); *C08F 8/30* (2013.01); *C08F 297/02* (2013.01); *C08F 297/026* (2013.01)

(58) Field of Classification Search
CPC .. C08F 293/00; C08F 297/02; C08F 297/026; C08F 8/14; C08F 8/30; C08F 8/32; C08F 8/24; C08F 8/40; C08F 8/34
See application file for complete search history.

(56) References Cited

U.S. PATENT DOCUMENTS 5,789,487 A * 8/1998 Matyjaszewski ......... C08F 4/40
                                                           525/301
2015/0329664 A1* 11/2015 Cheng .................... C08F 293/00
                                                           427/256

FOREIGN PATENT DOCUMENTS

| JP | 2008-036491 A | 2/2008 |
| JP | 2014-521790 A | 8/2014 |
| WO | WO 2013/019679 A1 | 2/2013 |

OTHER PUBLICATIONS

Ogura, Yusuke etal, "Terminal-selective Transesterification of Chlorine-Capped Poly (Methyl Methacrylate)s: A Modular Approach to Telechelic and Pinpoint-Functionalized Polymers" Apr. 4, 2016, Journal of the American Chemical Society, 138, p. 5012-5015 (Year: 2016).*

(Continued)

*Primary Examiner* — Ling Siu Choi
*Assistant Examiner* — David L Miller
(74) *Attorney, Agent, or Firm* — Knobbe, Martens, Olson & Bear LLP

(57) ABSTRACT

A composition for forming a phase-separated structure contains a block copolymer having a block (b1) consisting of a repeating structure of a styrene unit and a block (b2) consisting of a repeating structure of a methyl methacrylate unit, in which the block (b2) is disposed at least at one terminal portion of the block copolymer, the block copolymer has a structure (e1) represented by General Formula (e1) at least at one main chain terminal, and the structure (e1) is bonded to the main chain terminal of the block (b2) disposed at a terminal portion of the block copolymer. $Re^{e0}$ represents a hydrocarbon group containing a hetero atom, and Re1 represents a hydrogen atom or a halogen atom.

(Continued)

(56) References Cited

OTHER PUBLICATIONS

Yoshida et al, "Chain-End Functionalization with Saccharide for 10 nm Microphase Separation: "Classical" PS-b-PMMA versus PS-b-PMMA-Saccharide" Oct. 30, 2018 Macromolecules 51 8870-8877 (Year: 2018).*
W. Hinsberg et al., Proceedings of SPIE, vol. 7637, 76370G-1-76370G-11, 2010.
K. Yoshida et al., Proceedings of the Society of Polymer Science, The Society of Polymer Science, Japan, vol. 67, No. 2, 2018.

* cited by examiner (e1)

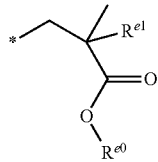

7 Claims, 1 Drawing Sheet

(51) Int. Cl.
*C08F 8/14* (2006.01)
*C08F 297/02* (2006.01)

RESIN COMPOSITION FOR FORMING PHASE-SEPARATED STRUCTURE, METHOD FOR PRODUCING STRUCTURE INCLUDING PHASE-SEPARATED STRUCTURE, AND BLOCK COPOLYMER

RELATED APPLICATION

This application claims priority to Japanese Patent Application No. 2019-096207 filed on May 22, 2019, the contents of which are incorporated herein by reference.

BACKGROUND OF THE INVENTION

Field of the Invention

The present invention relates to a resin composition for forming a phase-separated structure, a method for producing a structure including a phase-separated structure, and a block copolymer.

Description of Related Art

In recent years, due to the miniaturization of large-scale integrated circuits (LSI), a technique for processing finer structures has been demanded.

Therefore, a technique has been developed for forming finer patterns by utilizing a phase-separated structure formed by the self-organization of block copolymers in which incompatible blocks are bonded to each other (see, for example, Japanese Unexamined Patent Application, Publication No. 2008-36491).

In order to utilize a phase-separated structure of a block copolymer, it is essential to form self-organized nanostructures formed by microphase separation only in a specific region and arrange the nanostructures in a desired direction. In order to realize this, processes such as graphoepitaxy for controlling the phase separation pattern by the guide patterns and chemical epitaxy for controlling the phase separation pattern by the difference in the chemical state of the substrate have been proposed (See, for example, Proceedings of SPIE, Vol. 7637, No.76370G-1, 2010).

The block copolymer forms a structure having a regular periodic structure by phase separation.

The term "period of a structure" means the period of the phase structure observed when the structure of a phase-separated structure is formed and refers to the sum of the lengths of the respective phases incompatible with each other. In the case where the phase-separated structure forms a cylinder structure perpendicular to the substrate surface, the period (L0) of the structure is the center-to-center distance (pitch) between two adjacent cylinder structures.

It is known that the period (L0) of the structure is determined by inherent polymerization properties such as the degree of polymerization N and interaction parameter c of Flory-Huggins. That is, the larger the product "$\chi \times N$" of c and N is, the greater the mutual repulsion between the different blocks in the block copolymer becomes. Therefore, in the case of the relationship of $\chi \times N > 10.5$ (hereinafter, referred to as "strong separation limit"), the repulsion between the different kinds of blocks in the block copolymer is large, and the tendency for phase separation to occur increases. Accordingly, in the strong separation limit, the period of the structure is approximately $N^{2/3} \times \chi^{1/6}$, and satisfies the relationship of the following equation (1). That is, the period of the structure is proportional to the degree of polymerization N, which correlates with the molecular weight and the molecular weight ratio between the different blocks.

$$L0 \propto \theta \cdot N^{2/3} \cdot \chi^{1/6} \qquad (1)$$

[In the formula, L0 represents a period of the structure. a is a parameter indicating the size of the monomer. N represents a degree of polymerization. $\chi$ is an interaction parameter, and the higher the value thereof, the higher the phase separation performance.]

Accordingly, the period (L0) of the structure can be controlled by adjusting the composition and the total molecular weight of the block copolymer.

It is known that the periodic structure which the block copolymer forms varies the form such as a cylinder (columnar phase), a lamella (plate phase), and a sphere (spherical phase) depending on the volume ratio of the polymer components, and the period depends on the molecular weight. Therefore, a method for increasing the molecular weight of the block copolymers can be considered in order to form the structure of a relatively large period (L0) by utilizing the phase-separated structure formed by the self-organization of the block copolymers.

It is also conceivable to use a method for using a block copolymer having a larger interaction parameter ($\chi$) than that of a block copolymer having a block of styrene and a block of methyl methacrylate, which is a general-purpose block copolymer. For example, JP-T-2014-521790 proposes a composition including a block copolymer in which approximately 50% to 90% of a polyisoprene block of a poly(styrene-b-isoprene) block copolymer has been modified with an epoxy functional group.

SUMMARY OF THE INVENTION

However, at present, it is difficult to further improve the phase separation performance in forming a structure by utilizing a phase-separated structure formed by the self-organization of a block copolymer having a block of styrene and a block of methyl methacrylate, which is a general-purpose block copolymer.

In the composition described in PCT Japanese Translation Patent, Publication No. 2014-521790, a new monomer (isoprene) is required for producing the block copolymer. With the adoption of this new monomer, it is necessary to set new reaction conditions in order to achieve the narrow distribution of the block copolymer.

The present invention has been made in view of the above circumstances, and an object of the invention is to provide a method for producing a structure including a phase-separated structure, which can further improve the phase separation performance without requiring a new monomer, a resin composition for forming a phase-separated structure, which can be used therefor, and a block copolymer, which can be used in the production of the resin composition for forming a phase-separated structure.

The present inventors have found a method for improving phase separation performance in the phase-separated structure larger by using a block copolymer (PS-b-PMMA) having a block of styrene and a block of methyl methacrylate, which is a general-purpose block copolymer, without requiring a new monomer besides styrene and methyl methacrylate, thereby completing the present invention.

That is, a first aspect of the invention is a resin composition for forming a phase-separated structure containing a block copolymer having a block (b1) consisting of a repeating structure of a styrene unit and a block (b2) consisting of a repeating structure of a methyl methacrylate unit, in which the block (b2) is disposed at least at one terminal portion of the block copolymer, the block copolymer has a structure (e1) represented by General Formula (e1) at least at one main chain terminal, and the structure (e1) is bonded to the main chain terminal of the block (b2) disposed at the terminal portion of the block copolymer.

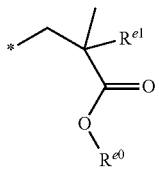

(e1)

[In the formula, $R^{e0}$ represents a hydrocarbon group containing a hetero atom, and $R^{e1}$ represents a hydrogen atom or a halogen atom. * represents a bond bonded to the carbon atom at an α-position of an adjacent methyl methacrylate unit.]

A second aspect of the invention is a method for producing a structure including a phase-separated structure including: a step of applying a resin composition for forming a phase-separated structure according to the first aspect on a support to form a layer including a block copolymer; and a step of phase-separating the layer including the block copolymer.

A third aspect of the invention is a block copolymer having a block (b1) consisting of a repeating structure of a styrene unit and a block (b2) consisting of a repeating structure of a methyl methacrylate unit, in which the block (b2) is disposed at least at one terminal portion of the block copolymer, the block copolymer has a structure (e1) represented by General Formula (e1) at least at one main chain terminal, and the structure (e1) is bonded to the main chain terminal of the block (b2) disposed at a terminal portion of the block copolymer.

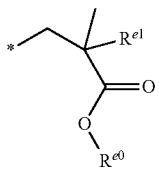

(e1)

[In the formula, $R^{e0}$ represents a hydrocarbon group containing a hetero atom, and $R^{e1}$ represents a hydrogen atom or a halogen atom. * represents a bond bonded to the carbon atom at an α-position of an adjacent methyl methacrylate unit.]

According to the invention, it is possible to provide a method for producing a structure including a phase-separated structure, which can further improve the phase separation performance without requiring a new monomer, a resin composition for forming a phase-separated structure, which can be used therefor, and a block copolymer, which is used in the production of the resin composition for forming a phase-separated structure.

DETAILED DESCRIPTION OF THE INVENTION

Figure 1:
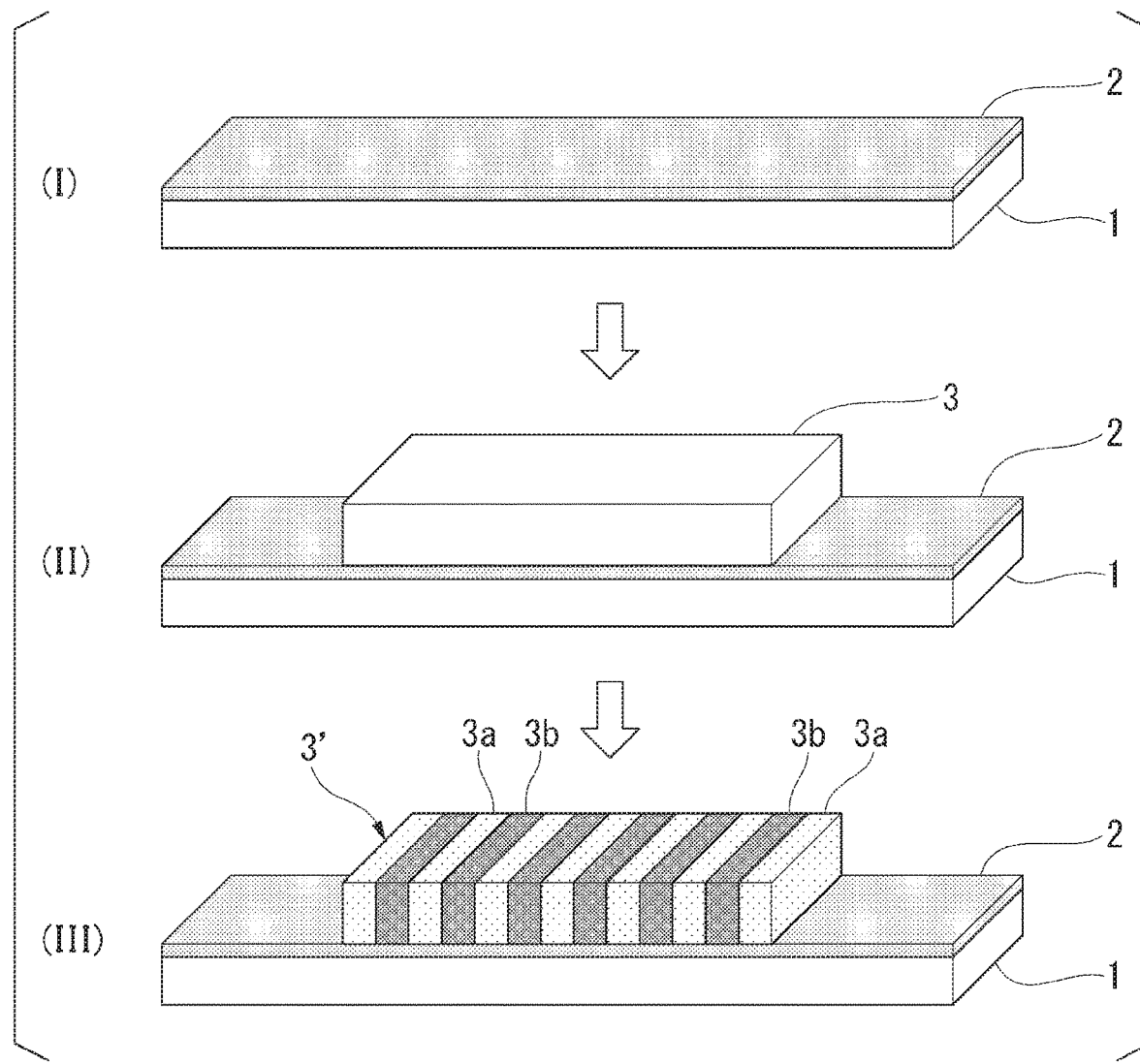
FIG. 1 is a schematic process diagram illustrating an example of an embodiment of a method for producing a structure including a phase-separated structure.

In this specification and claims, the term "aliphatic" is defined as a relative concept to aromatic, and means a group, a compound, and the like having no aromaticity.

Unless otherwise specified, the term "alkyl group" is intended to include linear, branched, and cyclic monovalent saturated hydrocarbon groups. The same applies to the alkyl group in the alkoxy group.

Unless otherwise specified, the term "alkylene group" is intended to include linear, branched, and cyclic divalent saturated hydrocarbon groups.

The "halogenated alkyl group" is a group in which a part or all of the hydrogen atoms of an alkyl group are substituted with a halogen atom, and examples of the halogen atom include a fluorine atom, a chlorine atom, a bromine atom, and an iodine atom.

The "fluorinated alkyl group" or "fluorinated alkylene group" refers to a group in which a part or all of the hydrogen atoms of an alkyl group or an alkylene group have been substituted with a fluorine atom.

The term "constituent unit" means a monomer unit for constituting a polymer compound (resin, polymer, and copolymer).

The case where it is described as "may have a substituent" includes both a case where a hydrogen atom (—H) is substituted with a monovalent group and a case where a methylene group (—CH$_2$—) is substituted with a divalent group.

The term "exposure" is a concept including irradiation with radiation as a whole.

"α-position (carbon atom at α-position)" means a carbon atom to which a side chain of a block copolymer is bonded, unless otherwise specified. The "carbon atom at the α-position" of the methyl methacrylate unit means a carbon atom to which a carbonyl group of methacrylic acid is bonded. The "carbon atom at the a-position" of the styrene unit means a carbon atom to which a benzene ring is bonded. "Number-average molecular weight" (Mn) is a number-average molecular weight in terms of standard polystyrene measured by size exclusion chromatography, unless otherwise specified. "Mass-average molecular weight" (Mw) is a mass-average molecular weight in terms of standard polystyrene measured by size exclusion chromatography, unless otherwise specified. A value obtained by adding a unit (g mol$^{-1}$) to the value of Mn or Mw represents a molar mass.

In the present specification and claims, there may be an asymmetric carbon depending on the structure represented by the chemical formula, and an enantiomer or a diastereoisomer may exist, and in that case, these isomers are represented by one formula. These isomers may be used alone or as a mixed solvent.

Resin Composition for Forming Phase-Separated Structure

The resin composition for forming a phase-separated structure of the embodiment includes a block copolymer having a block (b1) having a repeating structure of a styrene unit and a block (b2) having a repeating structure of a methyl methacrylate unit, in which the block (b2) is disposed at least at one terminal portion of the block copolymer. The block copolymer has a structure (e1) represented by General Formula (e1) at least at one main chain terminal, and the structure (e1) is bonded to the main chain terminal of the block (b2) disposed at a terminal portion of the block copolymer.

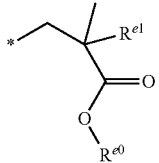

(e1)

[In the formula, $R^{e0}$ represents a hydrocarbon group containing a hetero atom, and $R^{e1}$ represents a hydrogen atom or a halogen atom. * represents a bond bonded to the carbon atom at an α-position of an adjacent methyl methacrylate unit.]

<Block Copolymer: (BCP) Component>

A block copolymer is a polymer in which a plurality of types of blocks (partial constituent components in which the same constituent units are repeatedly bonded) are bonded. The blocks constituting the block copolymer may be of two types or three or more types.

The block copolymer in the embodiment (hereinafter, also referred to as "(BCP) component") has a block (b1) having a repeating structure of a styrene unit and a block (b2) having a repeating structure of a methyl methacrylate unit, in which the block (b2) is disposed at least at one terminal portion of the block copolymer. Further, the (BCP) component has a structure (e1) represented by General Formula (e1) at least at one main chain terminal, and the structure (e1) is bonded to the main chain terminal of the block (b2) disposed at a terminal portion of the block copolymer.

Block (b1)

The block (b1) consists of a repeating structure of the styrene units.

As the styrene unit, a constituent unit represented by General Formula (b1-1) can be exemplified.

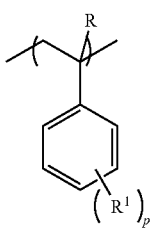

(b1-1)

In the formula, R is a hydrogen atom or a methyl group. $R^1$ is an alkyl group having 1 to 5 carbon atoms. p is an integer of 0 to 5.

In the formula (b1-1), $R^1$ is an alkyl group having 1 to 5 carbon atoms, preferably an alkyl group having 1 to 4 carbon atoms, and still more preferably a methyl group or an ethyl group.

In the formula (b1-1), p is an integer of 0 to 5, preferably an integer of 0 to 3, more preferably 0 or 1, and particularly preferably 0.

Block (b2)

The block (b2) consists of a repeating structure of a methyl methacrylate unit.

The methyl methacrylate units are constituent units represented by General Formula (b2-1).

The (BCP) component may have another block in addition to the block (b1) and the block (b2). In a preferable embodiment, the (BCP) component is a block copolymer in which the block (b1) and the block (b2) are bonded to each other. The (BCP) component is preferably a polystyrene-polymethyl methacrylate block copolymer (PS-b-PMMA).

In the (BCP) component, a molar ratio of the styrene unit to the methyl methacrylate unit is preferably from 20:80 to 80:20, and more preferably from 40:60 to 60:40.

The number-average molecular weight (Mn) of the (BCP) component (in terms of standard polystyrene measured by size exclusion chromatography) is not particularly limited, and is preferably from 20,000 to 60,000, more preferably from 25,000 to 50,000, more preferably from 25,000 to 45,000, and particularly preferably from 25,000 to 30,000.

In the (BCP) component, the block (b2) is disposed at least at one terminal portion. The block (b2) (hereinafter, also referred to as "terminal block (b2)") disposed at the terminal portion of the (BCP) component is a block of which one end of the block is bonded to the block (b1), and the other end of the block is not bonded to any block. The (BCP) component may have the terminal block (b2) at both terminal portions, or may have the terminal block (b2) at only one terminal portion. Preferably, the (BCP) component has the terminal block (b2) only at one terminal portion.

Structure (e1)

The (BCP) component has a structure (e1) represented by General Formula (e1) at least at one main chain terminal. The structure (e1) is bonded to the main chain terminal of the terminal block (b2). In the case where the (BCP) component has the terminal block (b2) at both terminal portions, the structure (e1) may be bonded to the main chain terminal of both terminal blocks (b2), or may be bonded to the main chain terminal of one terminal block (b2). Here, the "main chain" of the block (b2) means a carbon chain formed by polymerization of a methacrylic acid monomer in the block (b2). It can be said that the "main chain" of the block (b2) is the longest carbon chain among the carbon chains constituting the block (b2).

In General Formula (e1), $R^{e1}$ represents a hydrogen atom or a halogen atom.

Examples of the halogen atom in $R^{e1}$ include a fluorine atom, a chlorine atom, a bromine atom, and an iodine atom. Among them, a chlorine atom is preferable.

In General Formula (e1), * represents a bond bonded to the carbon atom at an α-position of an adjacent methyl methacrylate unit.

In General Formula (e1), $R^{e0}$ is a hydrocarbon group containing a hetero atom.

The hydrocarbon group in $R^{e0}$ may be an aliphatic hydrocarbon group containing a hetero atom or an aromatic hydrocarbon group containing a hetero atom.

Aliphatic Hydrocarbon Group Containing Hetero Atoms

The aliphatic hydrocarbon group in the aliphatic hydrocarbon group containing a hetero atom may be a saturated aliphatic hydrocarbon group or an unsaturated aliphatic hydrocarbon group. More specifically, examples of the aliphatic hydrocarbon group include a linear or branched aliphatic hydrocarbon group and an aliphatic hydrocarbon group having a ring in the structure.

The linear aliphatic hydrocarbon group preferably has 1 to 30 carbon atoms, more preferably has 3 to 20 carbon atoms, and still more preferably has 4 to 15 carbon atoms. The branched aliphatic hydrocarbon group preferably has 3 to 30 carbon atoms, more preferably has 3 to 20 carbon atoms, and still more preferably has 4 to 15 carbon atoms.

Specific examples of the linear or branched aliphatic hydrocarbon group include linear alkyl groups such as a methyl group, an ethyl group, an n-propyl group, an n-butyl group, an n-pentyl group, an n-hexyl group, an n-heptyl group, an n-octyl group, an n-nonyl group, and an n-decyl group; linear alkenyl groups such as an isopropyl group, an isobutyl group, a tert-butyl group, an isopentyl group, a neopentyl group, a 1,1-diethyl propyl group, and a 2,2-dimethyl butyl group; branched alkyl groups such as a vinyl group, a propenyl group (allyl group), and a 2-butenyl group; linear alkynyl group such as a 1-methyl vinyl group, a 2-methyl vinyl group, a 1-methyl propenyl ethynyl group, 2-methyl propenyl, a propargyl group, and a 3-pentynyl group; and a branched alkynyl group such as 1-methyl propargyl group.

The linear or branched aliphatic hydrocarbon group in $R^{e0}$ contains a hetero atom. Examples of the hetero atom include an oxygen atom, a nitrogen atom, a sulfur atom, and a halogen atom.

The hetero atom contained in the linear or branched aliphatic hydrocarbon group in $R^{e0}$ may be included in a substituent that is substituted with a hydrogen atom of the linear or branched aliphatic hydrocarbon group. Examples of the substituent include a hydroxy group, a hydroxyalkyl group (such as a hydroxymethyl group), a carboxy group, an alkoxy group, a halogen atom, an azido group, an amino group, an alkylamino group (such as a methylamino group), and a dialkylamino group (dimethylamino group). As the substituent, a hydroxy group, a halogen atom, or an azido group is preferable. Examples of the halogen atom include a fluorine atom, a chlorine atom, a bromine atom, and an iodine atom, and a fluorine atom or a chlorine atom is preferable, and a fluorine atom is more preferable. The alkyl group in the substituent preferably has 1 to 5 carbon atoms, more preferably has 1 to 3 carbon atoms, and still more preferably has 1 or 2 carbon atoms.

The hetero atom contained in the linear or branched aliphatic hydrocarbon group in $R^{e0}$ may be substituted with a part of the methylene group constituting the aliphatic hydrocarbon chain. Examples of the hetero atom include an oxygen atom, a nitrogen atom, and a sulfur atom. Among them, as the hetero atom, an oxygen atom or a nitrogen atom is preferable, and an oxygen atom is more preferable.

As a specific example of a linear or branched aliphatic hydrocarbon group with which a part of a methylene group is substituted, a part of a methylene group (—$CH_2$—) is substituted with an oxygen atom (—O—). Examples of such an aliphatic hydrocarbon group include a group having an oxyalkylene structure (—$(CH_2)_tO$—) (t is an integer of 1 to 5), and an oxyethylene structure (—$CH_2CH_2O$—) is preferable. Specific examples of such $R^{e0}$ include —$(CH_2CH_2O)_k$—$CH_3$. k in the above formula is an integer of 1 or more, preferably 4 or more, more preferably 20 or more, still more preferably 40 or more, and particularly preferably 80 or more. The upper limit of k is not particularly limited, and is, for example, 300 or less, 200 or less, 150 or less. The range of k is preferably 4 to 300, more preferably 30 to 200, and still more preferably 40 to 150.

Examples of the aliphatic hydrocarbon group having a ring in the structure of $R^{e0}$ include an alicyclic hydrocarbon group (a group obtained by removing one hydrogen atom from an aliphatic hydrocarbon ring) and a group obtained by substituting one hydrogen atom of an aliphatic hydrocarbon ring with an alkylene group. The alkylene group preferably has 1 to 10 carbon atoms. The aliphatic hydrocarbon ring preferably has 3 to 10 carbon atoms, and more preferably 3 to 6 carbon atoms.

The aliphatic hydrocarbon ring may be polycyclic or monocyclic.

The monocyclic aliphatic hydrocarbon ring preferably has 3 to 6 carbon atoms, and specific examples thereof include cyclopropane, cyclobutane, cyclopentane, and cyclohexane.

The polycyclic aliphatic hydrocarbon ring preferably has 7 to 10 carbon atoms, and specific examples thereof include polycycloalkanes having a cross-linked polycyclic skeleton such as adamantane, norbornane, and isobornane.

The cyclic aliphatic hydrocarbon group in $R^{e0}$ contains a hetero atom. Examples of the hetero atom include an oxygen atom, a nitrogen atom, a sulfur atom, and a halogen atom.

The hetero atom contained in the cyclic aliphatic hydrocarbon group in $R^{e0}$ may be substituted with a part of the carbon atoms constituting a ring, and $R^{e0}$ may be an aliphatic heterocyclic ring. Examples of the hetero atom include an oxygen atom, a sulfur atom, and a nitrogen atom. Specific examples of the aliphatic heterocyclic ring include pyrrolidine, piperidine, ethylene oxide, tetrahydrofuran, tetrahydropyran, tetrahydrothiophene, and tetrahydrothiopyran.

In the case where the cyclic aliphatic hydrocarbon group in $R^{e0}$ contains an aliphatic heterocyclic ring, the aliphatic heterocyclic ring may have a substituent. Examples of the substituent include a hydroxy group, a hydroxyalkyl group (such as a hydroxymethyl group), a carboxy group, an alkoxy group, a halogen atom, an azido group, an amino group, an alkylamino group (such as a methylamino group), a dialkylamino group (dimethylamino group), an alkyl group, an alkenyl group, and an alkynyl group. In the above substituents, a hydroxyalkyl group, an alkoxy group, an alkylamino group, an alkyl group in a dialkylamino group, an alkyl group, an alkenyl group, and an alkynyl group preferably have 1 to 5 carbon atoms, more preferably has 1 to 3 carbon atoms, and still more preferably has 1 or 2 carbon atoms.

The hetero atom included in the cyclic aliphatic hydrocarbon group in $R^{e0}$ may be included in a substituent that is substituted with a hydrogen atom of the linear or cyclic aliphatic hydrocarbon group. Examples of the substituent include a hydroxy group, a hydroxyalkyl group (such as a hydroxymethyl group), a carboxy group, an alkoxy group, a halogen atom, an azido group, an amino group, an alkylamino group (such as a methylamino group), and a dialkylamino group (dimethylamino group). In the above substituents, a hydroxyalkyl group, an alkoxy group, an alkylamino group, and an alkyl group in a dialkylamino group preferably have 1 to 5 carbon atoms, more preferably has 1 to 3 carbon atoms, and still more preferably has 1 or 2 carbon atoms.

The cyclic aliphatic hydrocarbon group in $R^{e0}$ may have a substituent such as an alkyl group, an alkenyl group, or an alkynyl group in addition to the above-described substituent containing a hetero atom. An alkyl group, an alkenyl group, and an alkynyl group in the substituent preferably have 1 to 5 carbon atoms, more preferably have 1 to 3 carbon atoms, and still more preferably have 1 or 2 carbon atoms.

Among them, the aliphatic hydrocarbon group containing a hetero atom in $R^{eO}$ is preferably a linear or branched aliphatic hydrocarbon group containing a hetero atom, and a linear aliphatic hydrocarbon group containing a hetero atom is more preferable.

Aromatic Hydrocarbon Group Containing Hetero Atoms

In the case where the hydrocarbon group containing a hetero atom in $R^{eO}$ becomes an aromatic hydrocarbon group containing a hetero atom, the aromatic hydrocarbon group is a hydrocarbon group having at least one aromatic ring. This aromatic ring is not particularly limited as long as it is a cyclic conjugated system having 4n+2π electrons, and may be monocyclic or polycyclic. The number of carbon atoms in the aromatic ring is preferably from 5 to 20, more preferably from 5 to 18, and still more preferably from 6 to 16.

Specific examples of the aromatic ring include aromatic hydrocarbon rings such as benzene, naphthalene, anthracene, phenanthrene, and pyrene; and aromatic heterocyclic rings in which some of the carbon atoms constituting the aromatic hydrocarbon ring are substituted with hetero atoms. Examples of the hetero atom in the aromatic heterocyclic ring include an oxygen atom, a sulfur atom, and a nitrogen atom. Specific examples of the aromatic heterocyclic ring include a pyrrolidine ring, a pyridine ring, a thiophene ring, an imidazole ring, a triazole ring, and a tetrazole ring.

Specific examples of the aromatic hydrocarbon group in $R^{eO}$ include a group obtained by removing one hydrogen atom from the aromatic hydrocarbon ring or the aromatic heterocyclic ring (an aryl group or a heteroaryl group); a group obtained by removing one hydrogen atom from an aromatic compound containing two or more aromatic rings (such as biphenyl and fluorene); a group obtained by substituting one of the hydrogen atoms of the aromatic hydrocarbon ring or aromatic heterocyclic ring with an alkylene group (for example, an aryl alkyl group such as a benzyl group, a phenethyl group, a 1-naphthyl methyl group, a 2-naphthyl methyl group, a 1-naphthyl ethyl group, and a 2-naphthyl ethyl group). The alkylene group bonded to the aromatic hydrocarbon ring or the aromatic heterocyclic ring preferably has 1 to 15 carbon atoms, and more preferably has 2 to 10 carbon atoms.

The aromatic hydrocarbon group in $R^{eO}$ contains a hetero atom. Examples of the hetero atom include an oxygen atom, a nitrogen atom, a sulfur atom, and a halogen atom.

The hetero atom contained in the aromatic hydrocarbon group in $R^{eO}$ may be one with which a part of the carbon atoms constituting the aromatic hydrocarbon ring is substituted, and $R^{eO}$ may be a group containing an aromatic heterocyclic ring. Examples of the aromatic heterocyclic ring include those exemplified above.

In the case where $R^{eO}$ contains an aromatic heterocyclic ring, the aromatic heterocyclic ring may have a substituent. Examples of the substituent include a hydroxy group, a hydroxyalkyl group (such as a hydroxymethyl group), a carboxy group, an alkoxy group, a halogen atom, an azido group, an amino group, an alkylamino group (such as a methylamino group), a dialkylamino group (dimethylamino group), an alkyl group, an alkenyl group, and an alkynyl group. In the above substituents, a hydroxyalkyl group, an alkoxy group, an alkylamino group, an alkyl group in a dialkylamino group, an alkyl group, an alkenyl group, and an alkynyl group preferably have 1 to 5 carbon atoms, more preferably has 1 to 3 carbon atoms, and still more preferably has 1 or 2 carbon atoms.

The hetero atom included in the aromatic hydrocarbon group in $R^{eO}$ may be included in a substituent that is substituted with a hydrogen atom of the linear or aromatic hydrocarbon group. Examples of the substituent include a hydroxy group, a carboxy group, an alkoxy group, a halogen atom, an azido group, a hydroxyalkyl group (such as a hydroxymethyl group), an amino group, an alkylamino group (such as a methylamino group), and a dialkylamino group (dimethylamino group). In the above substituents, a hydroxyalkyl group, an alkylamino group, an alkoxy group, and an alkyl group in a dialkylamino group preferably have 1 to 5 carbon atoms, more preferably has 1 to 3 carbon atoms, and still more preferably has 1 or 2 carbon atoms.

The aromatic hydrocarbon group in $R^{eO}$ may have a substituent such as an alkyl group, an alkenyl group, or an alkynyl group in addition to the above-described substituent containing a hetero atom. An alkyl group, an alkenyl group, and an alkynyl group in the substituent preferably have 1 to 5 carbon atoms, more preferably have 1 to 3 carbon atoms, and still more preferably have 1 or 2 carbon atoms.

Among them, as the aromatic hydrocarbon group containing a hetero atom in $R^{eO}$, a group containing an aromatic heterocyclic ring is preferable, and a group obtained by substituting one of the hydrogen atoms of the aromatic heterocyclic ring with an alkylene group is more preferable.

Preferable examples of $R^{eO}$ include a linear or branched aliphatic hydrocarbon group having a substituent containing a hetero atom; a linear or branched aliphatic hydrocarbon group obtained by substituting a part of a methylene group constituting an aliphatic hydrocarbon chain with a hetero atom; an aliphatic hydrocarbon group having a ring in the structure, having a substituent containing a hetero atom; an aliphatic hydrocarbon group containing an aliphatic heterocyclic ring; an aromatic hydrocarbon group having a substituent containing a hetero atom; and a hydrocarbon group containing an aromatic heterocyclic ring. Among them, from the aspect that χ is likely to be high and the phase separation performance is further improved, a linear or branched aliphatic hydrocarbon group having a substituent containing a hetero atom and a linear or branched aliphatic hydrocarbon group obtained by substituting a part of a methylene group constituting an aliphatic hydrocarbon chain with a hetero atom; and a hydrocarbon group containing an aromatic heterocyclic ring are preferable.

More specifically, a linear or branched aliphatic hydrocarbon group obtained by substituting a part of hydrogen atoms with a halogen atom (preferably fluorine atom); an aliphatic hydrocarbon group obtained by substituting a part of hydrogen atoms with an amino group, an alkylamino group, or a dialkylamino group; a linear or branched aliphatic hydrocarbon group obtained by substituting a part of hydrogen atoms with an azido group; a group obtained by removing one hydrogen atom from an aromatic heterocyclic ring containing a nitrogen atom; a group obtained by substituting one of the hydrogen atoms of an aromatic heterocyclic ring containing a nitrogen atom with an alkylene group; and a group having an oxyalkylene structure (—$(CH_2)_tO$—) (t is an integer of 1 to 5) (preferably a group having an oxyethylene structure (—$CH_2CH_2O$—)). The aliphatic hydrocarbon group in the groups exemplified above is preferably a linear aliphatic hydrocarbon group.

Specific examples of $R^{eO}$ are described below. In the following formula, * represents a bond bonded to the oxygen atom in General Formula (e1). k is an integer of 1 or more, preferably 4 or more, and still more preferably 10 or more.

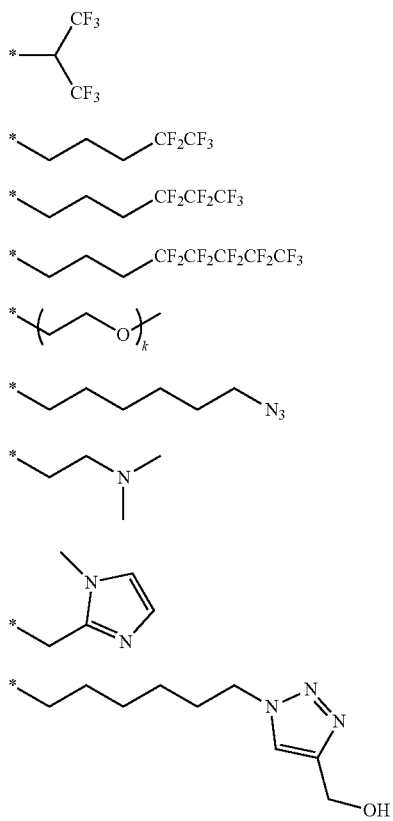

Among the above, $R^{e0}$ is preferably a group represented by any of Formulae (Re0-2), (Re0-5), (Re0-6), and (Re0-9).

Preferable examples pf the structure (e1) include a structure represented by General Formula (e1-1).

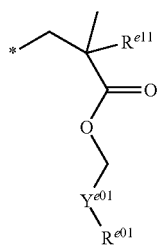

[In the formula, $R^{e01}$ represents a hydrocarbon group containing a hetero atom, $R^{e11}$ represents a hydrogen atom or a halogen atom, and $Y^{e01}$ represents an alkylene group which may have a substituent. * represents a bond bonded to the carbon atom at an α-position of an adjacent methyl methacrylate unit.]

In General Formula (e1-1), $R^{e11}$ represents a hydrogen atom or a halogen atom.

Examples of the halogen atom in $R^{e11}$ include a fluorine atom, a chlorine atom, a bromine atom, and an iodine atom. Among them, a chlorine atom is preferable.

In General Formula (e1-1), * represents a bond bonded to the carbon atom at an α-position of an adjacent methyl methacrylate unit.

In General Formula (e1-1), $R^{e01}$ represents an alkylene group which may have a substituent.

The alkylene group in $Y^{e01}$ may be linear or branched, but is preferably linear. The alkylene group in $Y^{e01}$ preferably has 1 to 20 carbon atoms, more preferably has 1 to 15 carbon atoms, still more preferably has 1 to 10 carbon atoms, and particularly preferably has 1 to 6 carbon atoms.

The alkylene group in $Y^{e01}$ may have a substituent. Examples of the substituent include a hydroxy group, a hydroxyalkyl group (such as a hydroxymethyl group), a carbonyl group, an alkoxy group, a halogen atom, an azido group, an amino group, an alkylamino group (such as a methylamino group), and a dialkylamino group (dimethylamino group) and the like.

$Y^{e01}$ is preferably an alkylene group having no substituent.

In General Formula (e1-1), $R^{e01}$ represents a hydrocarbon group containing a hetero atom.

Examples of the hydrocarbon group containing a hetero atom in $R^{e01}$ are the same as those exemplified as the hydrocarbon group in $R^{e0}$ in General Formula (e1). Examples of the hydrocarbon group containing a hetero atom include a linear or branched aliphatic hydrocarbon group having a substituent containing a hetero atom; a linear or branched aliphatic hydrocarbon group obtained by substituting a part of a methylene group constituting an aliphatic hydrocarbon chain with a hetero atom; an aliphatic hydrocarbon group having a ring in the structure, having a substituent containing a hetero atom; an aliphatic hydrocarbon group containing an aliphatic heterocyclic ring; an aromatic hydrocarbon group having a substituent containing a hetero atom; and a hydrocarbon group containing an aromatic heterocyclic ring. Among them, from the aspect that χ is likely to be high and the phase separation performance is further improved, a linear or branched aliphatic hydrocarbon group having a substituent containing a hetero atom and a linear or branched aliphatic hydrocarbon group obtained by substituting a part of a methylene group constituting an aliphatic hydrocarbon chain with a hetero atom; and a hydrocarbon group containing an aromatic heterocyclic ring are preferable.

More specifically, a linear or branched aliphatic hydrocarbon group obtained by substituting a part of hydrogen atoms with a halogen atom (preferably fluorine atom); an aliphatic hydrocarbon group obtained by substituting a part of hydrogen atoms with an amino group, an alkylamino group, or a dialkylamino group; a linear or branched aliphatic hydrocarbon group obtained by substituting a part of hydrogen atoms with an azido group; a group obtained by removing one hydrogen atom from an aromatic heterocyclic ring containing a nitrogen atom; and a group having an oxyalkylene structure (—$(CH_2)_tO$—) (t is an integer of 1 to 5) (preferably a group having an oxyethylene structure (—$CH_2CH_2O$—)). The aliphatic hydrocarbon group in the groups exemplified above is preferably a linear aliphatic hydrocarbon group.

Specific examples of $R^{e01}$ are described below. In the following formula, * represents a bond bonded to $Y^{e01}$. k1 represents an integer of 0 or more. k1 is preferably an integer of 1 to 10, more preferably an integer of 1 to 5, and still more preferably an integer of 1 to 4. k2 represents an integer of 1 or more, and preferably an integer of 4 or more.

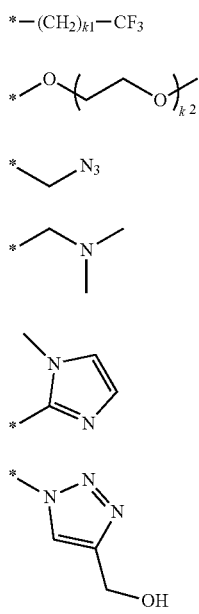
(Re01-1)
(Re01-2)
(Re01-3)
(Re01-4)
(Re01-5)
(Re01-6)
Specific examples of the structure (e1) are described below, but the structure is not limited thereto. In the formula, * represents a bond bonded to the carbon atom at an α-position of an adjacent methyl methacrylate unit. k is an integer of 1 or more, preferably 4 or more, and still more preferably 10 or more.
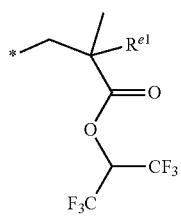
(e1-1)
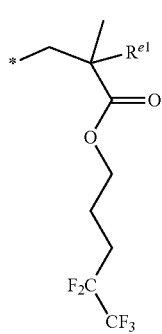
(e1-2)
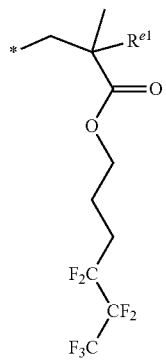
(e1-3)
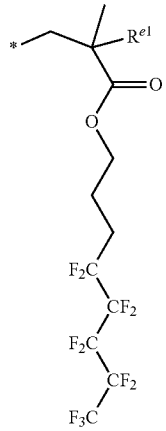
(e1-4)
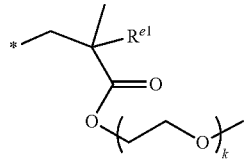
(E1-5)
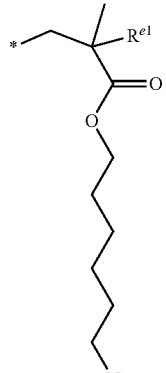
(e1-6)
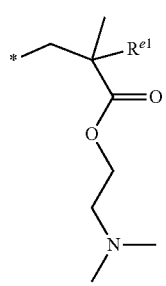
(e1-7)

-continued (e1-8)

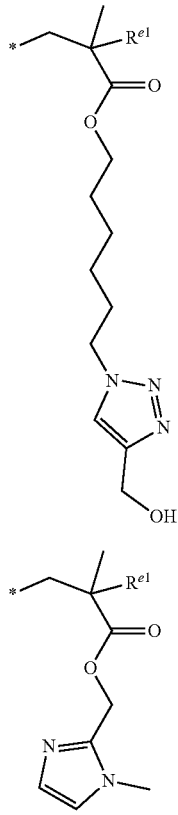

(e1-9)

Among the above, the structure (e1) is preferably a structure represented by any one of the formulas (e1-2), (e1-5), (e1-6), and (e1-8).

The structure of the terminal block (b2) in which the structure (e1) is bonded to the main chain terminal can be represented by General Formula (b2e-1). The (BCP) component has one or two structures represented by General Formula (b2e-1), and preferably has one.

(b2e-1)

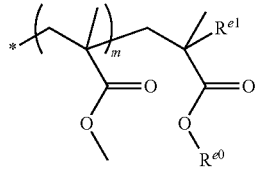

[In the formula, $R^{e0}$ and $R^{e1}$ are the same as $R^{e0}$ and $R^{e1}$ in General Formula (e1), respectively. m is an integer of 1 or more. * represents a bond bonded to the carbon atom at an α-position of an adjacent constituent unit.]

In General Formula (b2e-1), $R^{e0}$ and $R^{e1}$ are the same as $R^{e01}$ and $R^{e1}$ in General Formula (e1) respectively, and preferable examples include the same ones respectively.

In General Formula (b2e-1), m is an integer of 1 or more. The upper limit of m is not particularly limited. m can be, for example, 40 to 480.

In the case where the structure (e1) is a structure represented by General Formula (e1-1), the structure of the terminal block (b2) in which the structure (e1) is bonded to the main chain terminal is represented by General Formula (b2e-1-1).

(b2e-1-1)

[In the formula, $R^{e01}$, $R^{e11}$ and $Y^{e01}$ are the same as $R^{e01}$, $R^{e11}$ and $Y^{e01}$ in General Formula (e1-1), respectively. m represents an integer of 1 or more. * represents a bond bonded to the carbon atom at an α-position of an adjacent constituent unit.]

In General Formula (b2e-1-1), $R^{e01}$, $R^{e11}$ and $Y^{e01}$ are the same as $R^{e01}$, $R^{e11}$, and $Y^{e01}$ in General Formula (e1-1) respectively, and preferable examples include the same ones respectively. In General Formula (b2e-1-1), m is an integer of 1 or more, and is the same as m in General Formula (b2e-1).

The number-average molecular weight (Mn) of the (BCP) component (in terms of standard polystyrene measured by size exclusion chromatography) is not particularly limited, and is preferably from 20,000 to 60,000, more preferably from 25,000 to 50,000, more preferably from 25,000 to 4,5000, and particularly preferably from 25,000 to 30,000.

The molecular weight distribution (Mw/Mn) of the (BCP) component is preferably from 1.0 to 1.5, more preferably from 1.0 to 1.2, and still more preferably from 1.0 to 1.1.

The period (the length for one molecule of the block copolymer) of the (BCP) component is preferably from 10 to 40 nm, more preferably from 15 to 30 nm, and still more preferably from 15 to 20 nm. The period of the (BCP) component can be measured by forming a phase-separated structure using a resin composition for forming a phase-separated structure containing the (BCP) component, and then analyzing the phase-separated structure by an X-ray small-angle scattering (SAXS) method.

Method for Producing Block Copolymer

The block copolymer (the (BCP) component) of the embodiment can be produced, for example, by a production method including the following steps.

Step (p1): step of obtaining a block copolymer (hereinafter, referred to as "block copolymer precursor") which has a block (b1) having a repeating structure of a styrene unit and a block (b2) having a repeating structure of a methyl methacrylate unit, in which the block (b2) is disposed at least at one terminal portion.

Step (p2): step of reacting a block copolymer precursor with a compound having a hydroxy group or a titanium alkoxide of a compound having a hydroxy group to obtain a block copolymer Step (p1):

The block copolymer precursor can be obtained by, for example, conducting a polymerization reaction of a monomer (for example, styrene) that induces a repeating structure of styrene units, then adding a monomer (methacrylic acid) that induces a repeating structure of a methyl methacrylate unit in a polymerization reaction solution, and further performing the polymerization reaction. Alternatively, it can be obtained by performing the polymerization reaction of methyl methacrylate, then adding a monomer (for example, styrene) that induces a repeating structure of a styrene unit to the polymerization reaction solution, and further performing the polymerization reaction. As the polymerization reaction, living polymerization is preferable because it is easy to synthesize with narrow dispersion. As a preferable living polymerization method, living anionic polymerization and living radical polymerization can be exemplified, and living anionic polymerization is particularly preferable since the narrow distribution can be further achieved.

Step (p2): The compound having a hydroxy group is not particularly limited as long as it is a compound capable of transesterification with the "—OCH$_3$" site of the methyl methacrylate unit. A compound having a hydroxy group can be represented by $R^{e0}$—OH. $R^{e0}$ in the above formula represents a hydrocarbon group which may contain a hetero atom, and is the same as $R^{e0}$ in General Formula (e1). Hereinafter, the compound having a hydroxy group is also referred to as $R^{e0}$—OH.

The reaction between the block copolymer precursor and $R^{e0}$—OH can be performed in the presence of titanium alkoxide of $R^{e0}$—OH (Ti) $(OR^{e0})_4$) in an organic solvent. An example of the organic solvent is toluene. The reaction can be performed, for example, at 80° C. to 120° C. and preferably 90° C. to 110° C. for 15 to 30 hours, preferably 20 to 25 hours. After the reaction, a small amount of water may be added, and the reaction may be further performed at room temperature for about 20 to 40 minutes.

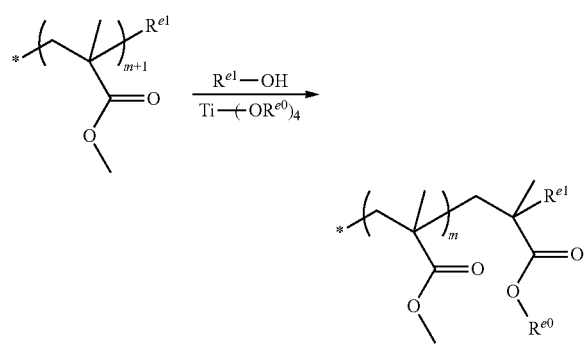

[In the formula, $R^{e0}$, $R^{e1}$, and m are the same as $R^{e0}$, $R^{e1}$ and m in General Formula (b2e-1), respectively. * represents a bond bonded to the carbon atom at an a-position of a styrene unit of an adjacent block (b1).]

In addition, the reaction between the block copolymer precursor and Ti $(OR^{e0})_4$ can be performed in an organic solvent under the same temperature conditions and reaction time as described above. An example of the organic solvent is toluene.

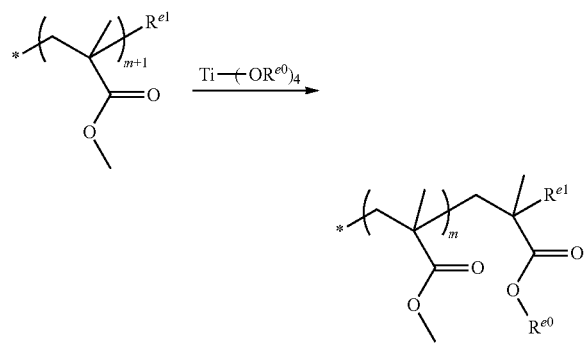

[In the formula, $R^{e0}$, $R^{e1}$, and m are the same as $R^{e0}$, $R^{e1}$, and m in General Formula (b2e-1), respectively. * represents a bond bonded to the carbon atom at an α-position of an adjacent constituent unit.]

After the above reaction, dilution with an organic solvent such as trahydrofuran, filtration, concentration, dialysis and the like are performed to obtain a block copolymer.

Ti $(OR^{E0})_4$ can be obtained, for example, by reacting tetraisopropyl orthotitanate (Ti $(OiPr)_4$) with $R^{e0}$—OH in an organic solvent. An example of the organic solvent is toluene. The reaction can be performed under an argon atmosphere, and the reaction temperature can be 60° C. to 100° C. and preferably 70° C. to 90° C. The reaction time can be 30 to 90 minutes, and more preferably 40 to 80 minutes. After the reaction, Ti $(OR^{E0})_4$ can be obtained by removing the organic solvent by filtration under reduced pressure or the like.

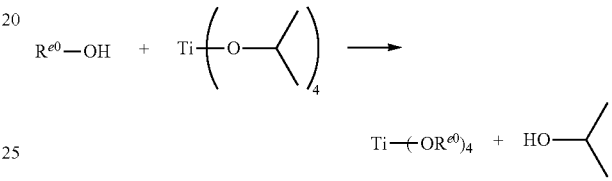

The block copolymer in the embodiment may have a step (p3) of reacting a further compound with the block copolymer obtained in the step (p2). For example, in the case where $R^{e0}$ in $R^{e0}$—OH has a reactive functional group, a further compound can be reacted with the reactive functional group. Examples of the reactive functional group include, but are not limited to, an azido group (—N$_3$), a hydroxyl group (—OH), an amino group (—NH$_3$), an ethynyl group (—C≡CCH), and the like.

The reaction of the further compound with the reactive functional group can be performed according to a conventional method depending on the type of the reactive functional group. For example, in the case where $R^{e0}$ has an azido group, a compound having an ethynyl group can be reacted as a further compound. In the case where $R^{e0}$ has an ethynyl group, a compound having an azido group can be reacted as a further compound. In the case where $R^{e0}$ has a hydroxyl group or an amino group, a compound having a carboxy group or the like can be reacted as a further compound.

According to the production method having the above steps (p1) and (p2), a block copolymer with improved phase separation performance can be obtained by modifying the main chain terminal of the terminal block (b2). Further, in the block copolymer molecule, only the methyl methacrylate unit located at the main chain terminal of the terminal block (b2) can be modified, so that a block copolymer of stable quality can always be obtained.

Organic Solvent Component

The resin composition for forming a phase-separated structure of the embodiment can be prepared by dissolving the (BCP) component in an organic solvent component.

Any organic solvent component may be used as long as it can dissolve the respective components to be used and form a homogeneous solution, and arbitrary solvents may be selected from any solvents known in the related art as a solvent for a film composition including a resin as a main component.

Examples of the organic solvent component include lactones such as γ-butyrolactone; ketones such as acetone, methyl ethyl ketone, cyclohexanone, methyl-n-pentyl ketone, methyl isopentyl ketone, and 2-heptanone; polyhydric alcohols such as ethylene glycol, diethylene glycol, propylene glycol, and dipropylene glycol; a compound having an ester bond such as ethylene glycol monoacetate, diethylene glycol monoacetate, propylene glycol monoacetate, and dipropylene glycol monoacetate; derivatives of polyhydric alcohols such as compounds having an ether bond such as monoalkyl ethers such as monomethyl ether, monoethyl ether, monopropyl ether, and monobutyl ether or monophenyl ether of the polyhydric alcohols or compounds having an ester bond [among these, propylene glycol monomethyl ether acetate (PGMEA) and propylene glycol monomethyl ether (PGME) are preferable]; cyclic ethers such as dioxane, or esters such as methyl lactate, ethyl lactate (EL), methyl acetate, ethyl acetate, butyl acetate, methyl pyruvate, ethyl pyruvate, methyl methoxy propionate, and ethyl ethoxy propionate; aromatic organic solvents such as anisole, ethyl benzyl ether, cresyl methyl ether, diphenyl ether, dibenzyl ether, phenetole, butyl phenyl ether, ethyl benzene, diethyl benzene, pentyl benzene, isopropyl benzene, toluene, xylene, cymene, and mesitylene.

The organic solvent components may be used alone or as a mixed solvent of two or more kinds thereof. Among these, propylene glycol monomethyl ether acetate (PGMEA), propylene glycol monomethyl ether (PGME), cyclohexanone, and EL are preferable.

A mixed solvent which is obtained by mixing PGMEA and a polar solvent is also preferable. The blending ratio (mass ratio) may be appropriately determined in consideration of compatibility between PGMEA and the polar solvent, and it is preferably in a range of 1:9 to 9:1 and more preferably 2:8 to 8:2.

For example, in the case where EL is blended as a polar solvent, the mass ratio of PGMEA:EL is preferably 1:9 to 9:1 and more preferably 2:8 to 8:2. In the case where PGME is blended as the polar solvent, the mass ratio of PGMEA:PGME is preferably 1:9 to 9:1, more preferably 2:8 to 8:2, and still more preferably 3:7 to 7:3. In the case where PGME and cyclohexanone are blended as a polar solvent, the mass ratio of PGMEA:(PGME+cyclohexanone) is preferably 1:9 to 9:1, more preferably 2:8 to 8:2, and still more preferably 3:7 to 7:3.

As the organic solvent component in the resin composition for forming a phase-separated structure, in addition to those components, a mixed solvent in which PGMEA, EL, or the mixed solvent of PGMEA and a polar solvent is mixed with γ-butyrolactone is also preferable. In this case, the mass ratio of the former to the latter is, as the mixing ratio, preferably 70:30 to 95:5.

The concentration of the organic solvent component included in the resin composition for forming a phase-separated structure is not particularly limited, and the component is appropriately set at a concentration with which the coating can be performed according to the coating film thickness. The solid content concentration is generally used in a range of 0.2 to 70 mass % and preferably in a range of 0.2 to 50 mass %.

Optional Component

The resin composition for forming a phase-separated structure may appropriately include, if desired, miscible additives such as additional resins for improving the layer performance, surfactants for improving coatability, a dissolution inhibitor, a plasticizer, a stabilizer, a colorant, a halation inhibitor, a dye, a sensitizer, a base-proliferating agent, and a basic compound, in addition to the above-mentioned (BCP) component and the organic solvent component.

According to the resin composition for forming a phase-separated structure of the embodiment described above, by containing a block copolymer ((BCP) component) having a structure (e1) at the main chain terminal of the terminal block (b2), the phase separation performance can be further improved without requiring a new monomer other than styrene and methyl methacrylate.

In addition, since the structure (e1) does not exist randomly in the molecule of the block copolymer, but exists only at the main chain terminal of the terminal block (b2), the quality of the block copolymer is stabilized. As a result, the quality of the resin composition for forming a phase-separated structure can be stabilized.

When the block copolymer satisfies the following equation (2), the tendency of phase separation to occur is increased. In the following equation, $\chi$ represents the Flory-Huggins interaction parameter, and N represents the degree of polymerization. According to the following equation (2), by increasing the value of $\chi$, even a block copolymer having a low degree of polymerization (N) can be phase-separated.

$$\chi \cdot N > 10.5 \qquad (2)$$

On the other hand, a period (L0) of the block copolymer is almost proportional to $N^{2/3} \cdot \chi^{1/6}$ as shown in the above equation (1). Therefore, by using a block copolymer having a lower value of N, a fine phase-separated structure having a shorter period can be formed.

In the (BCP) component in the embodiment, the structure (e1) is introduced into the main chain terminal of the terminal PMMA block (b2) of PS-b-PMMA, so that the value of $\chi$ can be increased without changing the degree of polymerization (N). Therefore, PS-b-PMMA having a lower degree of polymerization (N) can be selected according to the above equation (2). As a result, it possible to prepare a resin composition for forming a phase-separated structure capable of forming a finer phase-separated structure having a shorter period.

In addition, the (BCP) component in the embodiment can achieve high polarity by using a block copolymer (PS-b-PMMA) having a block of styrene unit and a block of methyl methacrylate unit already synthesized in a narrow distribution state by living anionic polymerization and the like and then by substituting the main chain terminal of the PMMA. Accordingly, it is possible to use a block copolymer which maintains a narrow distribution state and has an increased difference in Ω. As a result, the phase separation performance can be further enhanced.

Method for Producing Structure Including Phase-Separated Structure

The method for producing a structure including a phase-separated structure according to the embodiment includes a step of applying a resin composition for forming a phase-separated structure of the above embodiment on a support to form a layer including a block copolymer (hereinafter, referred to as "step (i)") and a step of phase-separating layer including the block copolymer (hereinafter, referred to as "step (ii)").

Hereinafter, a method for producing a structure including a phase-separated structure will be described in detail with reference to FIG. 1. However, the present invention is not limited thereto.

FIG. 1 shows an embodiment of a method for producing a structure including a phase-separated structure.

In the embodiment shown in FIG. 1, first, an undercoat agent layer 2 is formed by applying an undercoat agent on a support 1 (FIG. 1 (I)).

Next, the layer (BCP layer) 3 including the (BCP) component is formed by applying the resin composition for forming a phase-separated structure of the above-described embodiment on the undercoat agent layer 2 (FIG. 1 (II); the above, step (i)).

Next, the BCP layer 3 is phase-separated into the phase 3a and the phase 3b by heating and annealing treatment (FIG. 1 (III); step (ii)).

According to the production method of this embodiment, that is, the production method including the step (i) and the step (ii), the structure 3' including the phase-separated structure is produced on the support 1 on which the undercoat agent layer 2 is formed.

Step (i)

In the step (i), the BCP layer 3 is formed by applying a resin composition for forming a phase-separated structure on the support 1.

In the embodiment shown in FIG. 1, first, the undercoat agent layer 2 is formed by applying the undercoat agent on the support 1.

By providing the undercoat agent layer 2 on the support 1, a hydrophilic/hydrophobic balance between the surface of the support 1 and the layer (BCP layer) 3 including the block copolymer can be achieved.

That is, in the case where the undercoat agent layer 2 includes a resin component having the constituent unit constituting the block (b1), the adhesiveness between the phase having the block (b1) of the BCP layer 3 and the support 1 is enhanced. In the case where the undercoat agent layer 2 includes a resin component having the constituent unit constituting the block (b2), the adhesiveness between the phase having the block (b2) of the BCP layer 3 and the support 1 is enhanced.

Accordingly, a cylinder structure oriented in the direction perpendicular to the surface of the support 1 is likely to be formed due to the phase separation of the BCP layer 3.

Undercoat Agent:

A resin composition can be used as an undercoat agent. The resin composition for the undercoat agent can be appropriately selected from the resin compositions known in the related art used for forming a thin film depending on the type of the block constituting the (BCP) component.

The resin composition for the undercoat agent may be, for example, a thermopolymerizable resin composition or may be a photosensitive resin composition such as a positive-type resist composition or a negative-type resist composition. A non-polymerizable film formed by applying a compound being a surface treatment agent may be used as an undercoat agent layer. For example, a siloxane-based organic monomolecular film formed by applying phenethyltrichlorosilane, octadecyltrichlorosilane, hexamethyldisilazane, or the like as a surface treating agent can also be suitably used as an undercoat agent layer.

Examples of such a resin composition include a resin composition including a resin having any of the constituent units constituting each of the block (b1) and the block (b2), a resin composition including a resin having both each block constituting the (BCP) component and a constituent unit having a high affinity, and the like.

As a resin composition for the undercoat agent, for example, a composition including a resin having both styrene and methyl methacrylate as a constituent unit and a compound or a composition including both a site having a high affinity with styrene such as an aromatic ring and a site having a high affinity with methyl methacrylate (such as a highly polar functional group) are preferably used.

As a resin having both styrene and methyl methacrylate as a constituent unit, a random copolymer of styrene and methyl methacrylate, an alternating polymer of styrene and methyl methacrylate (the polymer in which each monomer is alternately copolymerized), and the like can be exemplified.

In addition, as a composition including both a site having a high affinity with styrene and a site having a high affinity with methyl methacrylate, for example, a composition having a resin obtained by polymerizing at least, as a monomer, a monomer having an aromatic ring and a monomer having a high polarity functional group can be exemplified. As the monomer having an aromatic ring, a monomer having an aryl group obtained by removing a hydrogen atom from an aromatic hydrocarbon ring, such as a phenyl group, a biphenyl group, a fluorenyl group, a naphthyl group, an anthryl group, and a phenanthryl group, or a heteroaryl group in which carbon atoms constituting the ring of these groups are partially substituted with a hetero atom such as an oxygen atom, a sulfur atom or a nitrogen atom can be exemplified. In addition, as a monomer having a highly polar functional group, a monomer having a trimethoxysilyl group, a trichlorosilyl group, an epoxy group, a glycidyl group, a carboxyl group, a hydroxyl group, a cyano group, a hydroxyalkyl group in which the hydrogen atoms of the alkyl group are partially substituted with a hydroxyl group, and the like can be exemplified.

Further, as a compound including both a site having a high affinity with styrene and a site having a high affinity with methyl methacrylate, a compound including both an aryl group such as phenethyltrichlorosilane and a highly polar functional group, or a compound including both an alkyl group such as an alkylsilane compound and a highly polar functional group, and the like can be exemplified.

The resin composition for the undercoat agent can be produced by dissolving the above-mentioned resin in a solvent.

As such a solvent, any solvent may be used as long as it can dissolve the respective components to be used and form a homogeneous solution. For example, the same organic solvent components as exemplified in the description of the resin composition for forming a phase-separated structure of the above-described embodiment can be exemplified.

The type of the support 1 is not particularly limited as long as the resin composition can be applied on its surface. For example, a substrate made of an inorganic material such as a metal (silicon, copper, chromium, iron, and aluminum), glass, titanium oxide, silica or mica; a substrate made of an oxide such as $SiO_2$; a substrate made of a nitride such as SiN; a substrate made of an oxynitride such as SiON; and a substrate made of an organic material such as acryl, polystyrene, cellulose, cellulose acetate, phenolic resin, and the like can be exemplified. Among these, a metal substrate is preferable, and for example, a structure of a cylinder structure is likely to be formed in a silicon substrate (Si substrate) or a copper substrate (Cu substrate). Among these, a Si substrate is particularly preferable.

The size and shape of the support 1 are not particularly limited. The support 1 is not necessarily required to have a smooth surface, and substrates of various shapes can be appropriately selected. For example, a substrate having a curved surface, a flat surface having an uneven surface, and a substrate with a flaky shape can be exemplified.

An inorganic and/or organic film may be provided on the surface of the support 1.

As an inorganic film, an inorganic antireflection film (inorganic BARC) can be exemplified. As an organic film, an organic antireflection film (organic BARC) can be exemplified.

The inorganic film can be formed, for example, by applying an inorganic antireflection film composition such as a silicon-based material on a support and by baking the film, and the like. For example, the organic film is formed by applying a material for forming an organic film in which a resin component constituting the film is dissolved in an organic solvent on a substrate using a spinner or the like and by baking the film under heating conditions of preferably 200° C. to 300° C., preferably for 30 to 300 seconds and more preferably for 60 to 180 seconds. The material for forming this organic film does not necessarily need to have sensitivity to light or electron beams such as a resist film, and may or may not have sensitivity. Specifically, a resist or a resin generally used for the production of a semiconductor element or a liquid crystal display element can be used.

In addition, it is preferable that the material for forming an organic film be a material capable of forming an organic film which can be subjected to etching, particularly dry-etched so that the organic film can be etched through the pattern which is made of the block copolymer, formed by processing the BCP layer 3 and the pattern can be transferred on the organic film to form an organic film pattern. Among these, a material capable of forming an organic film capable of being subjected to etching such as oxygen plasma etching is preferable. Such a material for forming an organic film may be a material used for forming an organic film such as organic BARC in the related art. For example, the ARC series manufactured by NISSAN CHEMICAL INDUSTRIES, LTD., the AR series manufactured by Rohm and Haas Japan Ltd., and the SWK series manufactured by TOKYO OHKA KOGYO CO., LTD. and the like can be exemplified.

The method for forming the undercoat agent layer 2 by applying the undercoat agent on the support 1 is not particularly limited and the undercoat agent layer can be formed by a known method in the related art.

For example, the undercoat agent layer 2 can be formed by applying the undercoat agent on the support 1 by a known method in the related art such as using a spin coater or a spinner to form a coating film, and drying the coating film.

As a method for drying the coating film, any method for drying the coating film may be used as long as the solvent included in the undercoat agent can be volatilized, and for example, a method for baking the coating film can be exemplified. In this case, the baking temperature is preferably 80° C. to 300° C., more preferably 180° C. to 270° C., and still more preferably 220° C. to 250° C. The baking time is preferably 30 to 500 seconds and more preferably 60 to 400 seconds.

The thickness of the undercoat agent layer 2 after drying the coating film is preferably about 10 to 100 nm and more preferably about 40 to 90 nm.

The surface of the support 1 may be cleaned in advance before forming the undercoat agent layer 2 on the support 1.

The coatability of the undercoat agent is improved by cleaning the surface of the support 1.

As the cleaning treatment method, known methods in the related art can be used, and examples thereof include oxygen plasma treatment, ozone oxidation treatment, acid alkali treatment, chemical modification treatment, and the like.

After the undercoat agent layer 2 is formed, the undercoat agent layer 2 may be rinsed with a rinsing liquid such as a solvent, if necessary. Since the uncrosslinked portion of the undercoat agent layer 2 is removed by the rinsing, the affinity with at least one block constituting the block copolymer is improved, and therefore, a phase-separated structure having a cylinder structure oriented in the direction perpendicular to the surface of the support 1 is likely to be formed.

The rinsing liquid may be any one as long as it can dissolve the uncrosslinked portion and may be a solvent such as propylene glycol monomethyl ether acetate (PGMEA), propylene glycol monomethyl ether (PGME), ethyl lactate (EL) or a commercially available thinner liquid.

After the cleaning, post-baking may be performed in order to volatilize the rinsing liquid. The temperature condition of the post-baking is preferably from 80° C. to 300° C., more preferably from 100° C. to 270° C., and still more preferably from 120° C. to 250° C. The baking time is preferably 30 to 500 seconds and more preferably 60 to 240 seconds. The thickness of the undercoat agent layer 2 after such post-baking is preferably about 1 to 10 nm and more preferably about 2 to 7 nm.

Next, the layer (BCP layer) 3 including the (BCP) component is formed on undercoat agent layer 2.

The method for forming the BCP layer 3 on the undercoat agent layer 2 is not particularly limited. For example, a method for forming the coating film by applying a resin composition for forming a phase-separated structure of the above-described embodiment on the undercoat agent layer 2 by a known method in the related art such as using a spin coater or a spinner to form a coating film and by drying the coating film can be exemplified.

The thickness of the BCP layer 3 may be a thickness sufficient to cause phase separation, and the thickness is preferably from 20 to 100 nm and more preferably from 30 to 80 nm, in consideration of the type of the support 1, the structure period size of the phase-separated structure to be formed, or the uniformity of the nanostructure.

For example, in the case where the support 1 is a Si substrate, the thickness of the BCP layer 3 is preferably adjusted to 10 to 100 nm and more preferably 30 to 80 nm.

Step (ii)

In the step (ii), the BCP layer 3 formed on the support 1 is phase-separated.

By heating to perform an annealing treatment of the support 1 after step (i), a phase-separated structure is formed so that at least a part of the surface of the support 1 is exposed by selective removal of the block copolymer. That is, a structure 3' including a phase-separated structure which is phase-separated into a phase 3a and a phase 3b is produced on the support 1.

The annealing treatment is preferably performed under the temperature condition of being equal to or higher than the glass transition temperature of the (BCP) component used and lower than the thermal decomposition temperature. For example, in the case where the block copolymer is polystyrene-polymethyl methacrylate (PS-PMMA) block copolymer (Mass-average molecular weight of 5,000 to 100,000), the temperature is preferably 180° C. to 270° C. The heating time is preferably 30 to 3,600 seconds.

In addition, it is preferable that the annealing treatment be performed in a gas having low reactivity such as nitrogen.

According to the method for producing a structure including a phase-separated structure of the embodiment described above, since the resin composition for forming a phase-separated structure of the above embodiment is used, the phase separation performance of the block copolymer is further improved.

In addition, according to the method for producing a structure including a phase-separated structure of the embodiment, it is possible to produce a support having nanostructures whose positions and orientations are more freely designed on the surface of the support. For example, the structure to be formed has a high adhesiveness with the support and is likely to take a phase-separated structure having a cylinder structure oriented in the direction perpendicular to the surface of the support.

Optional Step

The method for producing a structure including a phase-separated structure is not limited to the above-described embodiment and may have steps (optional steps) in addition to step (i) and step (ii).

This optional step includes a step (hereinafter, referred to as "step (iii)") of selectively removing a phase having at least one block of the block (b1) and the block (b2) constituting the (BCP) component of the BCP layer 3, a step of forming a guide pattern, and the like.

Regarding Step (iii)

In the step (iii), the phase having at least one block of the block (b1) and the block (b2) constituting the (BCP) component of the BCP layer formed on the undercoat agent layer 2 is selectively removed. As a result, a fine pattern (a polymer nanostructure) is formed.

As a method for selectively removing the phase having blocks, a method for performing oxygen plasma treatment on the BCP layer, a method for performing hydrogen plasma treatment and the like can be exemplified.

For example, by performing oxygen plasma treatment, hydrogen plasma treatment or the like on the BCP layer after the phase separation of the BCP layer including the (BCP) component, the phase having the block (b1) is not selectively removed. The phase having the block (b2) is selectively removed.

Figure 2:
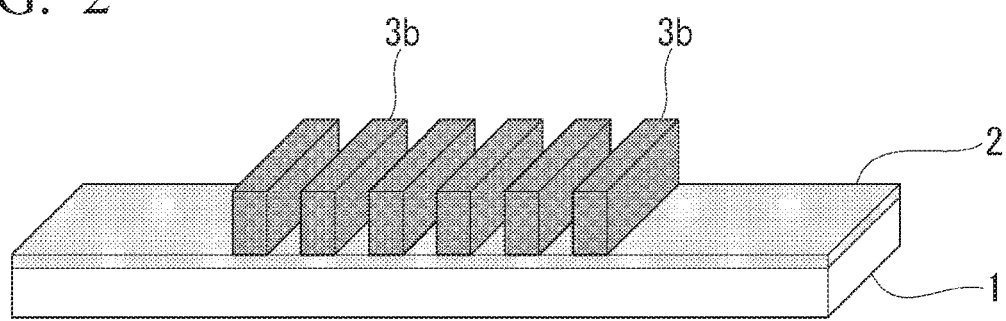
FIG. 2 is a diagram for explaining an example of an embodiment of an optional step.

FIG. 2 shows an example of an embodiment of step (iii).

In the embodiment shown in FIG. 2, in the case where the phase 3a is selectively removed and a pattern (polymer nanostructure) from the separated phase 3b is formed by performing oxygen plasma treatment on the structure 3' produced on the support 1 in step (ii). In this case, the phase 3b is a phase having the block (b1) and the phase 3a is a phase having the block (b2).

The support 1 having the patterns formed by the phase separation of the BCP layer 3 having the (BCP) component as described above can be used as it is, but the shape of the patterns (polymer nanostructure) of the support 1 may be changed by further heating.

The temperature condition for heating is preferably equal to or higher than the glass transition temperature of the block copolymer to be used and is preferably lower than the thermal decomposition temperature. In addition, the heating is preferably performed in a gas having low reactivity such as nitrogen.

Regarding Guide Pattern Forming Step

In the method for producing a structure including a phase-separated structure, a step (guide pattern forming step) of forming a guide pattern on the undercoat agent layer may be provided between the above-described step (i) and step (ii). This makes it possible to control the array structure of the phase-separated structures.

For example, even with respect to a block copolymer in which a random fingerprint-shaped phase-separated structure is formed in the case where the guide pattern is not provided, a phase-separated structure oriented along the groove can be obtained by providing a groove structure of a resist film on the surface of the undercoat agent layer. According to such a principle, a guide pattern may be provided on the undercoat agent layer 2. Further, in the case where the surface of the guide pattern has an affinity with any of the blocks constituting the (BCP) component, a phase-separated structure having a cylinder structure oriented in the direction perpendicular to the surface of the support is likely to be formed.

The guide pattern can be formed using, for example, a resist composition.

As the resist composition for forming the guide pattern, generally, those having the affinity with any of the blocks constituting the (BCP) component can be appropriately selected for use from the resist compositions used for forming resist patterns or modified products thereof. The resist composition may be any of a positive-type resist composition for forming a positive-type pattern in which the exposed area of the resist film is dissolved and removed and a negative-type resist composition for forming a negative-type pattern in which the unexposed area of the resist film is dissolved and removed, and the composition is preferably a negative-type resist composition. As the negative-type resist composition, for example, a resist composition including an acid generator, and a base material component in which the solubility in a developing solution including an organic solvent by the action of an acid is decreased by the action of an acid, and the base material component includes a resin component having a constituent unit which is decomposed by the action of an acid to increase the polarity is preferable.

After the BCP composition is poured on the undercoat agent layer on which the guide pattern is formed, an annealing treatment is performed to cause phase separation. Therefore, as the resist composition for forming the guide pattern, it is preferable that the composition form a resist film excellent in solvent resistance and heat resistance.

EXAMPLES

Hereinafter, the invention will be described in more detail with reference to examples, but the invention is not limited to the following examples.

Synthesis Example of Block Copolymer (1)

500 mg (35.7 mmol) of block copolymer (PS-b-PMMA) of styrene and methyl methacrylate (Mn=35000, Mw/Mn=1.03, n/m=170/170), 17.7 μL (476 mmol) of 2-propanol, 10.5 μL (35.7 μmol) of tetraisopropyl orthotitanate (Ti(OiPr)$_4$), and 3.00 mL of toluene were added to a Schlenk flask, and were heated at 100° C. and stirred for 24 hours under an argon atmosphere. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ to remove Ti (OiPr)$_4$. After removing the solvent under reduced pressure, the residue was dialyzed against acetone using a cellophane tube (Spectra/Por 6 Membrane; MWCO: 1,000). The obtained dialysis product was poured into hexane to obtain 116 mg of a block copolymer (1) as a white powder (yield: 23.2%, Mn=35,200, Mw/Mn=1.03).

$^1$H NMR (400 MHz, CDCl$_3$): δ 7.32-6.26 (br, aromatic), 4.94 (m, J=6.4 Hz, ω-terminal, 1H, —OCH (CH$_3$)$_2$), 3.82-3.38 (br, —OCH$_3$, PMMA), 2.42 (br, ω-terminal, 1H, —CH (CH$_3$) COO—), 2.24-0.77 (br, main chain —CH$_2$C—, —CCH$_3$, —CH$_2$CH—, CH$_2$CH—, PMMA, PS)

$^1$H NMR (400 MHz, CDCl$_3$): δ 7.32-6.26 (br, aromatic), 4.02 (m, ω-terminal, 2H, —OCH$_2$ (CH$_2$)$_3$CH$_3$), 3.82-3.38 (br, —OCH$_3$, PMMA), 2.47 (br, ω-terminal, —CH (CH$_3$) COO—), 2.24-0.77 (br, main chain —CH$_2$C—, —CCH$_3$, —CH$_2$CH—, CH$_2$CH—, PMMA, PS)

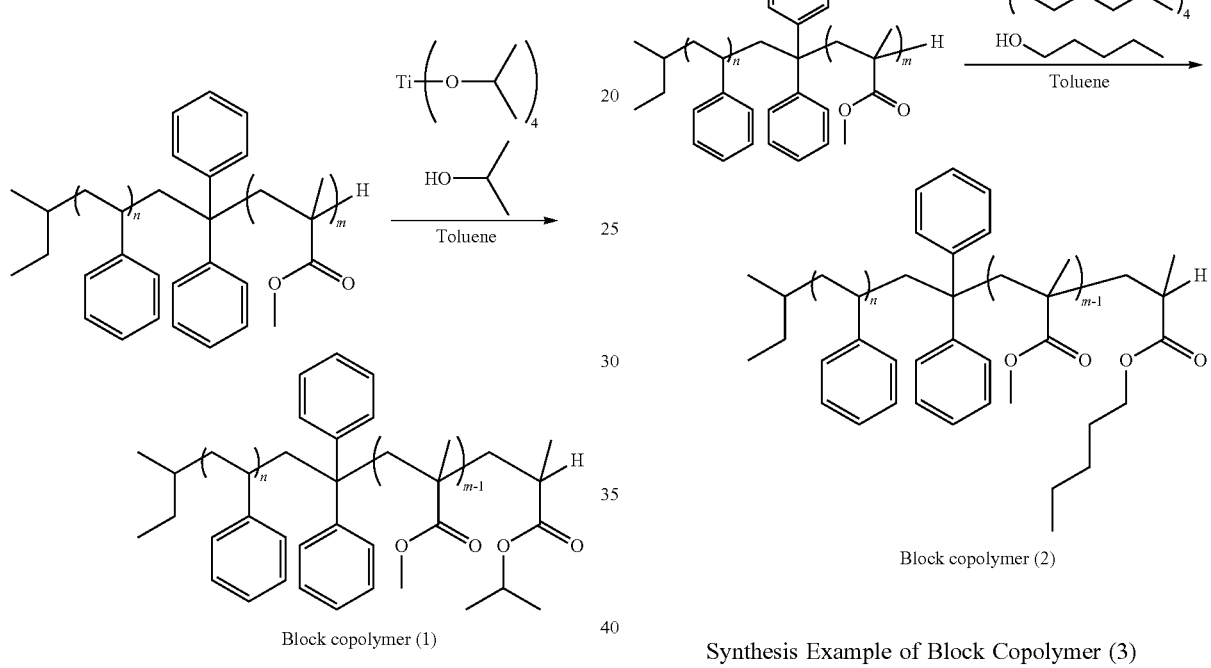

Block copolymer (1)

Block copolymer (2)

Synthesis Example of Block Copolymer (2)

25.8 μL (238 mmol) of 1-pentanol, 10.5 μL (35.7 μmol) of Ti (OiPr)$_4$, and 1.00 mL of toluene were added to a Schlenk flask and the mixture was stirred at 80° C. for 1 hour under an argon atmosphere. It was then cooled under liquid nitrogen. 2-propanol generated from the solvent and Ti (OiPr)$_4$ was removed under reduced pressure to obtain a titanium alkoxide of 1-pentanol. The obtained titanium alkoxide of 1-pentanol, 500 mg (11.9 mmol) of PS-b-PMMA (Mn=35000, Mw/Mn=1.03, n/m =170/170), 25.8 μL (238 mmol) of 1-pentanol, and 3.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ to remove Ti (OiPr)$_4$. After removing the solvent under reduced pressure, the residue was dialyzed against acetone using a cellophane tube (Spectra/Por 6 Membrane; MWCO: 1,000). The obtained dialysis product was poured into hexane to obtain 395 mg of a block copolymer (2) as a white powder (yield: 79.0%, Mn=36,700, Mw/Mn=1.03).

Synthesis Example of Block Copolymer (3)

15.9 μL (238 mmol) of benzyl alcohol, 10.5 μL (35.7 μμmol) of Ti (OiPr)$_4$, and 1.00 mL of toluene were added to a Schlenk flask and the mixture was stirred at 80° C. for 1 hour under an argon atmosphere. It was then cooled under liquid nitrogen. 2-propanol generated from the solvent and Ti (OiPr)$_4$ was removed under reduced pressure to obtain a titanium alkoxide of benzyl alcohol. The obtained titanium alkoxide of benzyl alcohol, 500 mg (11.9 mmol) of PS-b-PMMA (Mn=35000, Mw/Mn=1.03, n/m =170/170), 15.9 μL (238 mmol) of benzyl alcohol, and 3.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ to remove Ti (OiPr)$_4$. After removing the solvent under reduced pressure, the residue was dialyzed against acetone using a cellophane tube (Spectra/Por 6 Membrane; MWCO: 1,000). The obtained dialysis product was poured into hexane to obtain 311 mg of a block copolymer (3) as a white powder (yield: 62.2%, Mn=35,400, Mw/Mn=1.03).

$^1$H NMR (400 MHz, CDCl$_3$): δ 7.37 (br, ω-terminal, 5H, —OCH$_2$Ph), 7.32-6.26 (br, aromatic), 5.07 (m, ω-terminal, 2H, —OCH$_2$Ph), 3.82-3.38 (br, —OCH$_3$, PMMA), 2.54 (br, ω-terminal, —CH(CH₃)COO—), 2.24-0.77 (br, main chain —CH₂C—, —CH₂CH—, CH₂CH—, PMMA, PS)

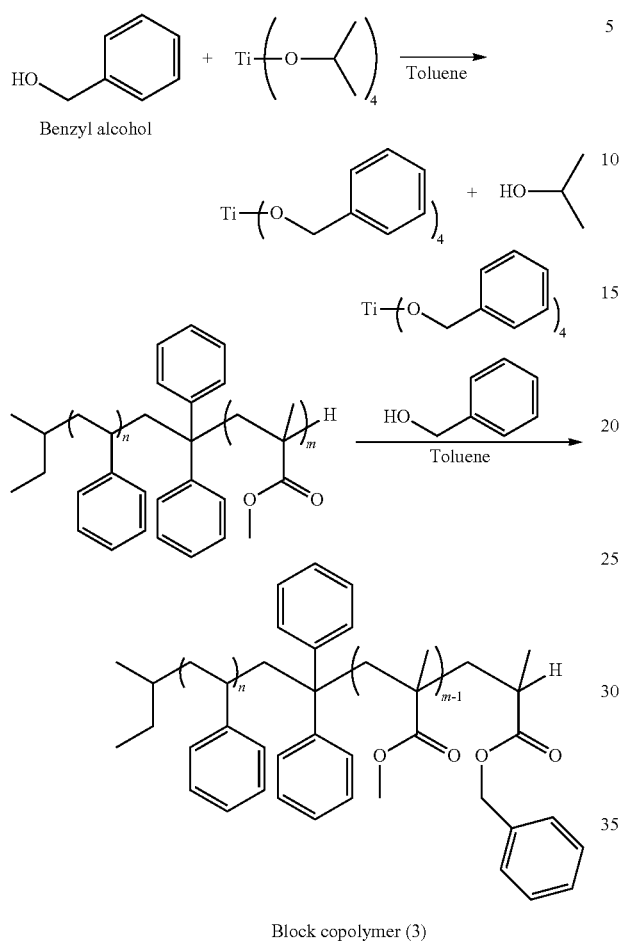

Block copolymer (3)

Synthesis Example of Block Copolymer (4)

75.3 mg (476 mmol) of 1-naphthalenemethanol, 10.5 μL (35.7 μmol) of Ti (OiPr)₄, and 1.00 mL of toluene were added to a Schlenk flask and the mixture was stirred at 80° C. for 1 hour under an argon atmosphere. It was then cooled under liquid nitrogen. 2-propanol generated from the solvent and Ti (OiPr)₄ was removed under reduced pressure to obtain a titanium alkoxide of 1-naphthalenemethanol. The obtained titanium alkoxide of 1-naphthalenemethanol, 500 mg (11.9 mmol) of PS-b-PMMA (Mn=35000, Mw/Mn=1.03, n/m=170/170), and 3.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ to remove Ti (OiPr)₄. After removing the solvent under reduced pressure, the residue was dialyzed against acetone using a cellophane tube (Spectra/Por 6 Membrane; MWCO: 1,000). The obtained dialysis product was poured into hexane to obtain 331 mg of a block copolymer (4) as a white powder (yield: 66.2%, Mn=37,000, Mw/Mn=1.03).

¹H NMR (400 MHz, CDCl₃): δ 7.91-7.70 (br, 3H, naphtalene), 7.55-7.40 (br, 3H, naphtalene), 7.32-6.26 (br, aromatic), 5.23 (m, ω-terminal, 2H, —OCH₂-naphtalene), 3.82-3.38 (br, —OCH₃, PMMA), 2.57 (br, ω-terminal, —CH(CH₃)COO—), 2.24-0.77 (br, main chain —CH₂C—, —CCH₃, —CH₂CH—, CH₂CH—, PMMA, PS)

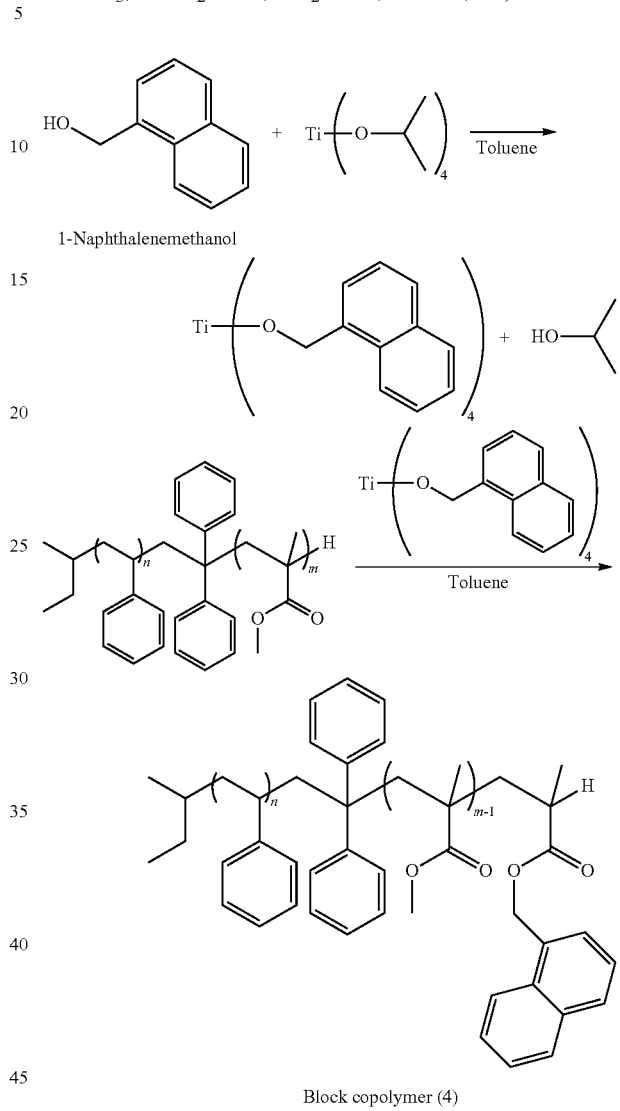

Block copolymer (4)

Synthesis Example of Block Copolymer (5)

75.3 mg (476 mmol) of 1-pyrenemethanol, 10.5 μL (35.7 μmol) of Ti (OiPr)₄ and 1.00 mL of toluene were added to a Schlenk flask and the mixture was stirred at 80° C. for 1 hour under an argon atmosphere. It was then cooled under liquid nitrogen. 2-propanol generated from the solvent and Ti (OiPr)₄ was removed under reduced pressure to obtain a titanium alkoxide of 1-pyrenemethanol. The obtained titanium alkoxide of 1-pyrenemethanol, 500 mg (11.9 mmol) of PS-b-PMMA (Mn=35000, Mw/Mn=1.03, n/m=170/170), and 3.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ to remove Ti (OiPr)₄. After removing the solvent under reduced pressure, the residue was dialyzed against acetone using a cellophane tube (Spectra/Por 6 Membrane; MWCO: 1,000). The obtained dialysis product was poured into hexane to obtain 381 mg of a block copolymer (5) as a white powder (yield: 76.2%, Mn=36,300, Mw/Mn=1.03).

$^1$H NMR (400 MHz, CDCl$_3$): δ 7.32-6.26 (br, aromatic), 3.82-3.38 (br, —OCH$_3$, PMMA), 2.24-0.77 (br, main chain —CH$_2$C—, —CCH$_3$, —CH$_2$CH—, CH$_2$CH—, PMMA, PS)

with tetrahydrofuran (THF) and filtered through a membrane filter having a pore diameter of 0.45μ to remove Ti (OiPr)$_4$. After removing the solvent under reduced pressure, the residue was dialyzed against acetone using a cellophane tube (Spectra/Por 6 Membrane; MWCO: 1,000). The obtained dialysis product was poured into hexane to obtain 237 mg of a block copolymer (6) as a white powder (yield: 47.4%, Mn=36,000, Mw/Mn=1.03).

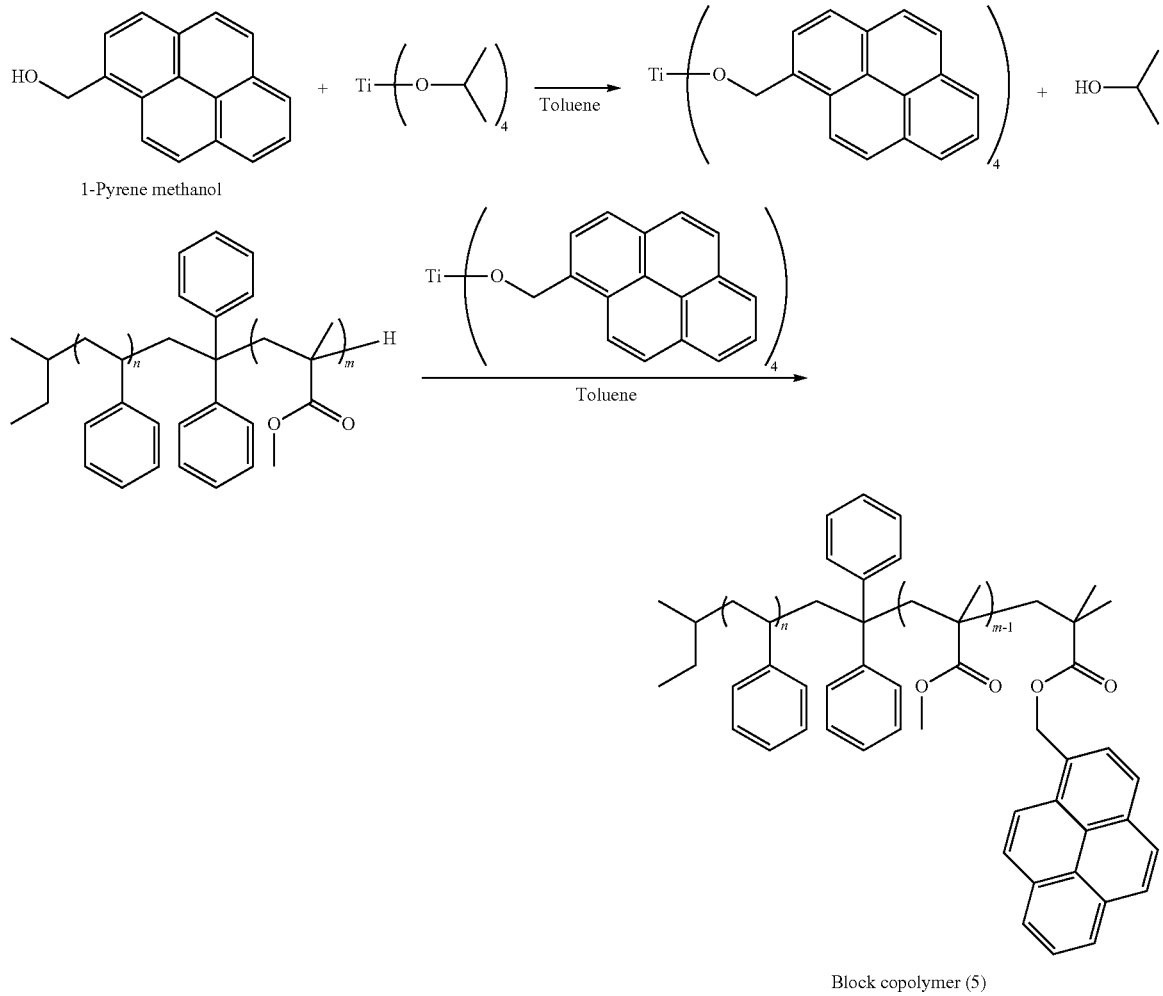

Block copolymer (5)

Synthesis Example of Block Copolymer (6)

31.4 μL (238 mmol) of 4,4,5,5,5-pentafluoro-1-pentanol (PFP), 10.5 μL (35.7 μmol) of Ti (OiPr)$_4$, and 1.00 mL of toluene were added to a Schlenk flask and stirred at 80° C. for 1 hour under an argon atmosphere. It was then cooled under liquid nitrogen. 2-propanol generated from the solvent and Ti (OiPr)$_4$ was removed under reduced pressure to obtain a titanium alkoxide of 4,4,5,5,5-pentafluoro-1-pentanol. The obtained titanium alkoxide of 4,4,5,5,5-pentafluoro-1-pentanol, 500 mg (11.9 mmol) of PS-b-PMMA (Mn=35000, Mw/Mn=1.03, n/m=170/170), 31.4 μL (238 mmol) of 4,4,5,5,5-pentafluoro-1-pentanol, and 3.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted $^1$H NMR (400 MHz, CDCl$_3$): δ 7.32-6.26 (br, aromatic), 4.10 (m, ω-terminal, 2H, —OCH$_2$ (CH$_2$)$_2$CF$_2$CF$_3$), 3.82-3.38 (br, —OCH$_3$, PMMA), 2.50 (br, ω-terminal, —CH (CH$_3$) COO—), 2.24-0.77 (br, main chain —CH$_2$C—, —CCH$_3$, —CH$_2$CH—, CH$_2$CH—, PMMA, PS)

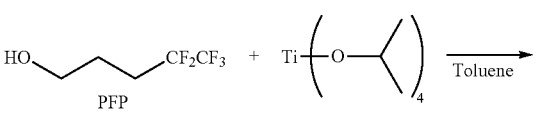

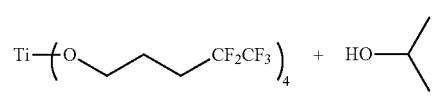

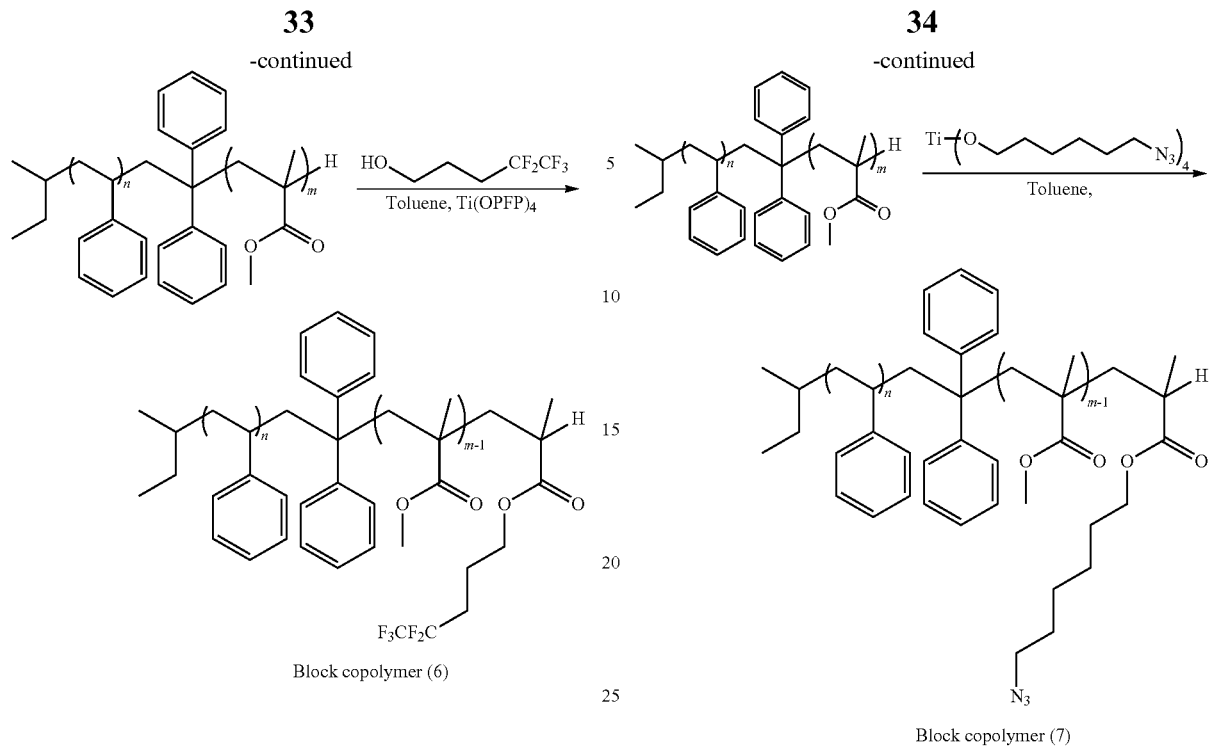

Synthesis Example of Block Copolymer (7)

12.6 mg (143 mmol) of 6-azido-1-hexanol, 6.28 μL (12.4 μmol) of Ti (OiPr)$_4$, and 1.00 mL of toluene were added to a Schlenk flask and the mixture was stirred at 80° C. for 1 hour under an argon atmosphere. It was then cooled under liquid nitrogen. 2-propanol generated from the solvent and Ti (OiPr)$_4$ was removed under reduced pressure to obtain a titanium alkoxide of 6-azido-1-hexanol. The obtained titanium alkoxide of 6-azido-1-hexanol, 300 mg (7.14 mmol) of PS-b-PMMA (Mn=35000, Mw/Mn=1.03, n/m=170/170), and 2.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ, to remove Ti (OiPr)$_4$. After removing the solvent under reduced pressure, the residue was dialyzed against acetone using a cellophane tube (Spectra/Por 6 Membrane; MWCO: 1,000). The obtained dialysis product was put into hexane to obtain 259 mg of a block copolymer (7) as a white powder (yield: 86.3%, Mn=35,200, Mw/Mn=1.03).

$^1$H NMR (400 MHz, CDCl$_3$): δ 7.32-6.26 (br, aromatic), 4.02 (m, ω-terminal, 2H, —OCH$_2$(CH$_2$)$_5$N3), 3.82-3.38 (br, —OCH$_3$, PMMA), 3.29 (t, J=6.6 Hz, ω-terminal, 2H, —CH$_2$N$_3$), 2.47 (br, ω-terminal, —CH (CH$_3$)COO—), 2.24-0.77 (br, main) chain —CH$_2$C—, —CCH$_3$, —CH$_2$CH—, CH$_2$CH—, PMMA, PS)

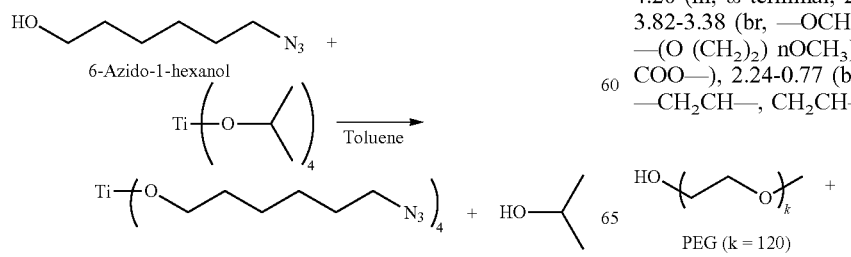

Synthesis Example of Block Copolymer (8)

780 mg (0.143 mmol) of poly (ethylene glycol) monomethyl ether (PEG) (k=120), 6.28 μL (12.4 μmol) of Ti (OiPr)$_4$, and 1.00 mL of toluene were added to a Schlenk flask and the mixture was stirred at 80° C. for 1 hour under an argon atmosphere. It was then cooled under liquid nitrogen. 2-propanol generated from the solvent and Ti (OiPr)$_4$ was removed under reduced pressure to obtain a titanium alkoxide of 6-azido-1-hexanol. The obtained titanium alkoxide of poly (ethylene glycol) monomethyl ether, 300 mg (7.14 mmol) of PS-b-PMMA (Mn=35000, Mw/Mn=1.03, n/m=170/170), and 2.00 mL of toluene were added to a Schlenk flask and stirred at 100° C. for 24 hours. It was then cooled to room temperature, a small amount of water was added and the mixture was stirred for a further 30 minutes. Thereafter, the mixture was diluted with tetrahydrofuran (THF) and filtered through a membrane filter having a pore diameter of 0.45μ to remove Ti (OiPr)$_4$. After removing the solvent under reduced pressure, the residue was dialyzed against acetone using a cellophane tube (Spectra/Por 6 Membrane; MWCO: 1,000). The obtained dialysis product was poured into hexane to obtain 112 mg of a block copolymer (8) as a white powder (yield: 32.9%, Mn=42,000, Mw/Mn=1.04).

$^1$H NMR (400 MHz, CDCl$_{13}$): δ 7.32-6.26 (br, aromatic), 4.20 (m, ω-terminal, 2H, —CH$_2$CH$_2$ (O (CH$_2$)$_2$) nOCH$_3$), 3.82-3.38 (br, —OCH$_3$, PMMA), 3.38 (s, ω-terminal, 3H, —(O (CH$_2$)$_2$) nOCH$_3$), 2.50 (br, ω-terminal, —CH (CH$_3$) COO—), 2.24-0.77 (br, main) chain —CH$_2$C—, —CCH$_3$, —CH$_2$CH—, CH$_2$CH—, PMMA, PS)

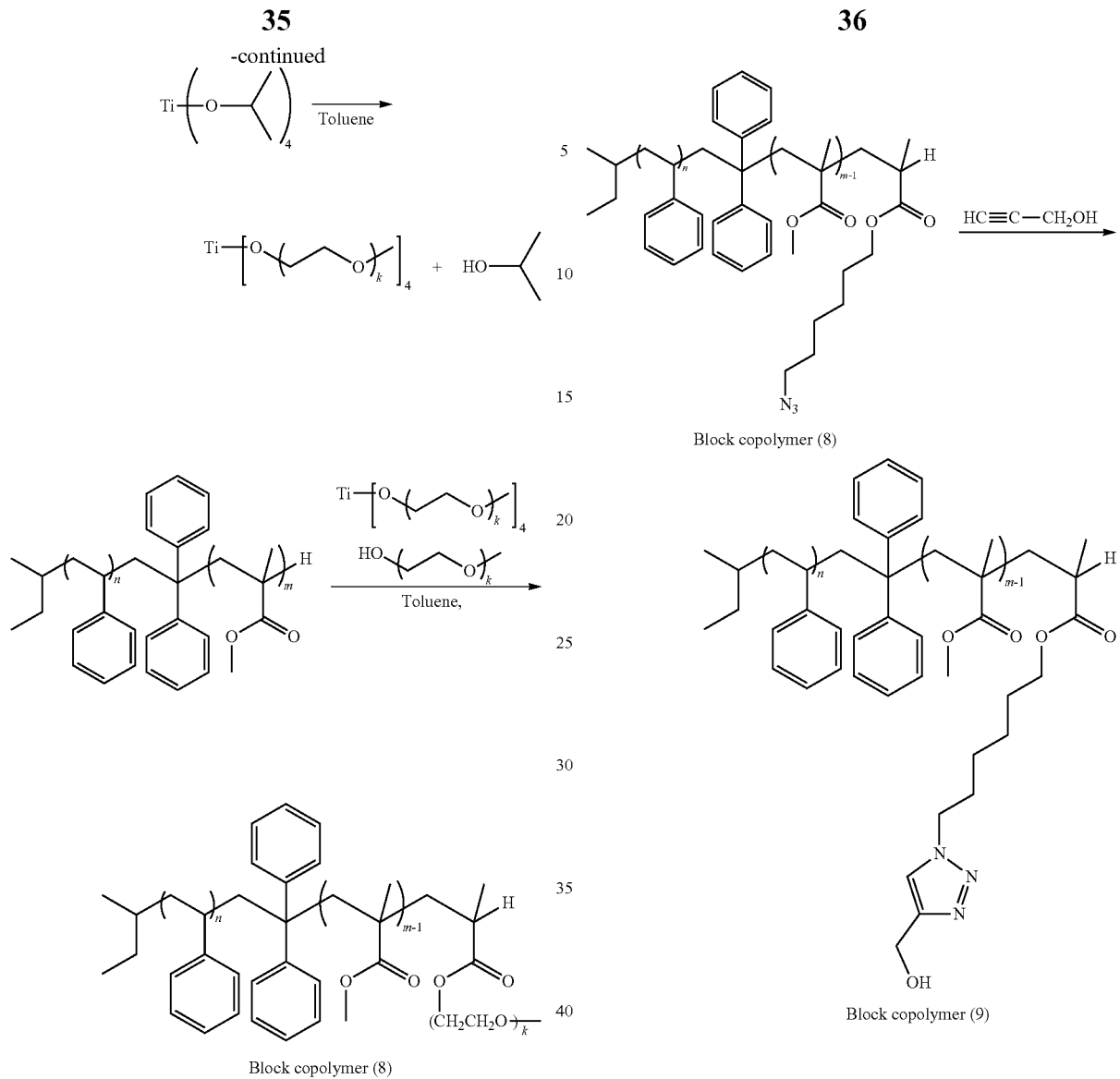

Block copolymer (8)

Block copolymer (9)

Block copolymer (8)

Synthesis Example of Block Copolymer (9)

Under an argon atmosphere, in a Schlenk flask, 154 mg (3.67 μmol) of block copolymer (7), 2.17 μL (36.7 μmol) of propargyl alcohol, 1.81 mg (18.3 μmol) of copper (I) chloride, 7.67 μL (36.7 μmol) of N,N,N',N'',N''-pentamethyl diethylenetriamine, and 5 mL of dimethyl formamide were added, and the mixture was stirred at 40° C. for 10 hours. Thereafter, a reaction solution was passed through silica gel, and the obtained crude product solution was mixed with an ion exchange resin and stirred for 3 hours. After removing the ion exchange resin, reprecipitation was performed in hexane to obtain 27.3 mg of a block copolymer (9) as a white powder (yield: 17.7%, Mn=37,500, Mw/Mn=1.03).

$^1$H NMR (400 MHz, CDCl$_3$): δ 7.58 (s, 1H, triazole), 7.32-6.26 (br, aromatic), 4.82 (d, J=6.4 Hz, ω-terminal, 2H, —CH$_2$OH), 4.39 (t, J=7.5 Hz, ω-terminal, 2H, —O(CH$_2$)$_5$CH$_2$), 4.00 (m, ω-terminal, 2H, —OCH$_2$ (CH$_2$)$_5$—), —CH (CH$_3$) COO—), 2.24-0.77 (br, main) chain —CH$_2$C—, —CCH$_3$, —CH$_2$CH—, CH$_2$CH—, PMMA, PS)

Preparation of Resin Composition

The respective components shown in Table 1 were mixed and dissolved to prepare a resin composition (solid content concentration of 0.8 mass %).

TABLE 1

| Resin composition | Block copolymer | Organic solvent component |
|---|---|---|
| Resin composition (1) | BCP-1 [100] | (S)-1 [12400] |
| Resin composition (2) | BCP-2 [100] | (S)-1 [12400] |
| Resin composition (3) | BCP-3 [100] | (S)-1 [12400] |
| Resin composition (4) | BCP-4 [100] | (S)-1 [12400] |
| Resin composition (5) | BCP-5 [100] | (S)-1 [12400] |
| Resin composition (6) | BCP-6 [100] | (S)-1 [12400] |
| Resin composition (7) | BCP-7 [100] | (S)-1 [12400] |
| Resin composition (8) | BCP-8 [100] | (S)-1 [12400] |

TABLE 1-continued

| Resin composition | Block copolymer | Organic solvent component |
| --- | --- | --- |
| Resin composition (9) | BCP-9 [100] | (S)-1 [12400] |
| Resin composition (10) | BCP-10 [100] | (S)-1 [12400] |

Each of the abbreviations in Table 1 has the following meanings. The numerical values in the brackets are the blending amount (parts by mass).
BCP-1: The block copolymer (1)
BCP-2: The block copolymer (2)
BCP-3: The block copolymer (3)
BCP-4: The block copolymer (4)
BCP-5: The block copolymer (5)
BCP-6: The block copolymer (6)
BCP-7: The block copolymer (7)
BCP-8: The block copolymer (8)
BCP-9: The block copolymer (9)
BCP-10: PS-b-PMMA (Mn=35000, Mw/Mn=1.03, PS/PMMA=170/170)
(S)-1: Propylene glycol monomethyl ether acetate Test Examples 1 to 10

Production of Structure including Phase-separated Structure

A structure including a phase-separated structure was obtained by using the resin compositions (1) to (10) according to the production method including the following step (i) and step (ii).

Step (i):
On the Si substrate on which the organic film was formed, the resin composition of each example was spin-coated so as to have a film thickness of 24 nm, thereby forming a resin composition layer (layer including a block copolymer).

Step (ii):
The resin composition layer formed on the Si substrate was baked at 240° C. for 60 seconds to form a phase-separated structure.

Step (iii):
Oxygen plasma treatment (200 mL/min, 40 Pa, 40° C., 200 W, 20 seconds) was performed on the Si substrate on which the phase-separated structure was formed by using TCA-3822 (manufactured by TOKYO OHKA KOGYO CO., LTD.) and thus PMMA phase was selectively removed.

Measurement by X-ray Small-Angle Scattering (SAXS) Method

The measurement was performed by the X-ray small-angle scattering (SAXS) method, and the period (nm) of the structure was obtained from the primary scattering peak of the SAXS pattern curve. The results are shown in Table 2.

In the production methods of Test Examples 1 to 10, the periodic structure of Lamella was confirmed in any of the examples.

Evaluation of Phase Separation Performance

The surface (phase-separated state) of the obtained substrate was observed with a scanning electron microscope SEM (SU8000, manufactured by Hitachi High-Technologies Corporation).

The phase separation performance was then evaluated based on the following evaluation criteria. The results are shown in Table 2 as "phase separation performance".

A: Vertical lamella pattern was observed
B: Vertical lamellar pattern was not observed.

TABLE 2

|  | Resin composition | Period (nm) | Phase separation performance |
| --- | --- | --- | --- |
| Test Example 1 | Resin composition (1) | 23.2 | B |
| Test Example 2 | Resin composition (2) | 23.2 | B |
| Test Example 3 | Resin composition (3) | 23.7 | B |
| Test Example 4 | Resin composition (4) | 23.8 | B |
| Test Example 5 | Resin composition (5) | 23.7 | B |
| Test Example 6 | Resin composition (6) | 24.1 | A |
| Test Example 7 | Resin composition (7) | 25.1 | A |
| Test Example 8 | Resin composition (8) | 26.2 | A |
| Test Example 9 | Resin composition (9) | 24.6 | A |
| Test Example 10 | Resin composition (10) | 23.7 | B |

From the results shown in Table 2, in Test Examples 6 to 9, it was possible to confirm that the phase separation performance was further improved.

In addition, in Test Examples 6 to 9, it was confirmed that the period was increased as compared with Test Example 10.

Since the period (L0) is almost proportional to $N^{2/3} \cdot \chi^{1/6}$, in the case where the degree of polymerization (N) is the same, an increase in the period (L0) means an increase in $\chi$. The block copolymers (1) to (9) used in Test Examples 1 to 9 are different from the PS-b-PMMA (BCP-10) used in Test Example 10 in that different modifications are introduced into the main chain terminals of the PMMA block. Therefore, the degree of polymerization (N) of the block copolymers (1) to (10) is the same.

Therefore, as compared with Test Example 10, the increase in the period in Test Examples 6 to 9 means that the x of the block copolymers (6) to (9) was larger than that of BCP-10. From these results, it was confirmed that x can be increased by introducing a specific structure (hydrocarbon group containing a hetero atom) into the PMMA main chain terminal of PS-b-PMMA.

On the other hand, in Test Examples 1 to 5, the improvement in the phase separation performance was not confirmed but the increase in the period was observed, as compared with Test Example 10.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 . . . Support
2 . . . Undercoat agent layer
3 . . . BCP layer
3' . . . Structure
3a . . . Phase
3b . . . Phase.

What is claimed is:
1. A resin composition for forming a phase-separated structure, comprising:
a block copolymer having a block (b1) having a repeating structure of a constituent unit represented by General Formula (b1-1) and a block (b2) having a repeating structure of a methyl methacrylate unit,

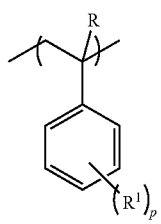

(b1-1)

wherein R is a hydrogen atom or a methyl group; $R^1$ is an alkyl group having 1 to 5 carbon atoms; and p is an integer of 0 to 5, wherein the block (b2) is disposed at least at one terminal portion of the block copolymer, the block copolymer has a structure (e1) represented by General Formula (e1) at least at one main chain terminal, and the structure (e1) is bonded to a main chain terminal of the block (b2) disposed at a terminal portion of the block copolymer,

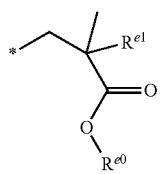

(e1)

wherein $R^{e0}$ represents a linear or branched aliphatic hydrocarbon group obtained by substituting a part of hydrogen atoms with an azido group, an aliphatic hydrocarbon group having a ring in the structure, having a substituent containing a hetero atom, an aliphatic hydrocarbon group containing an aliphatic heterocyclic ring, an aromatic hydrocarbon group having a substituent containing a hetero atom, a hydrocarbon group containing an aromatic heterocyclic ring, or a group represented by a formula—$(CH_2CH_2O)k\text{-}CH_3$, provided that k is an integer of 40 or more and $R^{e1}$ represents a hydrogen atom or a halogen atom; * represents a bond bonded to the carbon atom at an α-position of an adjacent methyl methacrylate unit.

2. The resin composition for forming a phase-separated structure according to claim 1, wherein the structure (e1) is a structure represented by General Formula (e1-1):

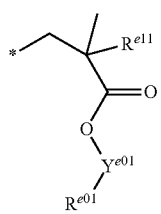

(e1-1)

wherein $R^{e01}$ represents a linear or branded aliphatic hydrocarbon group obtained by substituting a part of hydrogen atoms with an azido group, an aliphatic hydrocarbon group having a ring in the structure, having a substituent containing a hetero atom, an aliphatic hydrocarbon group containing an aliphatic heterocyclic ring, an aromatic hydrocarbon group having a substituent containing a hetero atom, a hydrocarbon group containing an aromatic heterocyclic ring, or a group represented by a formula —$(CH_2CH_2O)k\text{-}CH_3$, provided that k is an integer of 40 or more; $R^{e11}$ represents a hydrogen atom or a halogen atom; $Y^{e01}$ represents an alkylene group which may have a substituent; and * represents a bond bonded to the carbon atom at an α-position of an adjacent methyl methacrylate unit.

3. The resin composition for forming a phase-separated structure according to claim 1, wherein a number-average molecular weight of the block copolymer is 20,000 to 60,000.

4. A method for producing a structure including a phase-separated structure, the method, comprising:
applying a resin composition for forming a phase-separated structure according to claim 1 on a support to form a layer including a block copolymer; and
phase-separating the layer including the block copolymer.

5. A block copolymer, comprising:
a block (b1) having a repeating structure of a constituent unit represented by General Formula (b1-1) and a block (b2) having a repeating structure of a methyl methacrylate unit, (b1-1)

wherein R is a hydrogen atom or a methyl group; $R^1$ is an alkyl group having 1 to 5 carbon atoms; and p is an integer of 0 to 5, wherein the block (b2) is disposed at least at one terminal portion of the block copolymer, the block copolymer has a structure (e1) represented by General Formula (e1) at least at one main chain terminal, and the structure (e1) is bonded to a main chain terminal of the block (b2) disposed at a terminal portion of the block copolymer, (e1)

wherein $R^{e0}$ represents a linear or branded aliphatic hydrocarbon group obtained by substituting a part of hydrogen atoms with an azido group, an aliphatic hydrocarbon group having a ring in the structure, having a substituent containing a hetero atom, an aliphatic hydrocarbon group containing an aliphatic heterocyclic ring, an aromatic hydrocarbon group having a substituent containing a hetero atom, a hydrocarbon group containing an aromatic heterocyclic ring, or a group represented by a formula —$(CH_2CH_2O)_k$—$CH_3$, provided that k is an integer of 40 or more, $R^{e1}$ represents a hydrogen atom or a halogen atom; and * represents a bond bonded to the carbon atom at an α-position of an adjacent methyl methacrylate unit.

6. The block copolymer according to claim 5, wherein the structure (e1) is a structure represented by General Formula (e1-1):

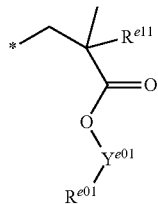

(e1-1)

wherein $R^{e01}$ represents a linear or branded aliphatic hydrocarbon group obtained by substituting a part of hydrogen atoms with an azido group, an aliphatic hydrocarbon group having a ring in the structure, having a substituent containing a hetero atom, an aliphatic hydrocarbon group containing an aliphatic heterocyclic ring, an aromatic hydrocarbon group having a substituent containing a hetero atom, a hydrocarbon group containing an aromatic heterocyclic ring, or a group represented by a formula —$(CH_2CH_2O)_k$—$CH_3$, provided that k is an integer of 40 or more; $R^{e11}$ represents a hydrogen atom or a halogen atom; represents an alkylene group which may have a substituent; and * represents a bond bonded to the carbon atom at an α-position of an adjacent methyl methacrylate unit.

7. The block copolymer according to claim 5, wherein a number-average molecular weight of the block copolymer is 20,000 to 60,000.

* * * * *